(12) United States Patent
Visco et al.

(10) Patent No.: US 9,660,311 B2
(45) Date of Patent: May 23, 2017

(54) AQUEOUS LITHIUM AIR BATTERIES

(75) Inventors: Steven J. Visco, Berkeley, CA (US);
Yevgeniy S. Nimon, Danville, CA (US); Lutgard C. De Jonghe, Lafayette, CA (US); Alexei Petrov, Walnut Creek, CA (US); Nikolay Goncharenko, Walnut Creek, CA (US)

(73) Assignee: POLYPLUS BATTERY COMPANY, Berkeley, CA (US)

( * ) Notice: Subject to any disclaimer, the term of this patent is extended or adjusted under 35 U.S.C. 154(b) by 448 days.

(21) Appl. No.: 13/588,911

(22) Filed: Aug. 17, 2012

(65) Prior Publication Data

US 2013/0045428 A1    Feb. 21, 2013

Related U.S. Application Data

(60) Provisional application No. 61/525,634, filed on Aug. 19, 2011.

(51) Int. Cl.
*H01M 8/22*    (2006.01)
*H01M 12/08*   (2006.01)

(52) U.S. Cl.
CPC .... *H01M 12/08* (2013.01); *H01M 2300/0005* (2013.01); *Y02E 60/128* (2013.01)

(58) Field of Classification Search
CPC ......... H01M 12/08; H01M 2300/0005; H01M 12/06; H01M 2004/024; Y02E 60/128
USPC ......................................... 429/405, 500, 535
See application file for complete search history.

(56) References Cited

U.S. PATENT DOCUMENTS

| | | | |
|---|---|---|---|
| 3,528,856 | A | 9/1970 | Ovshinsky |
| 3,607,417 | A | 9/1971 | McRae et al. |
| 3,615,835 | A | 10/1971 | Ovshinsky |
| 3,625,769 | A | 12/1971 | Lyall |
| 3,679,540 | A | 7/1972 | Zimmerman et al. |

(Continued)

FOREIGN PATENT DOCUMENTS

| | | |
|---|---|---|
| EP | 0111214 | 11/1983 |
| EP | 0694501 | 1/1996 |

(Continued)

OTHER PUBLICATIONS

International Search Report and Written Opinion dated Oct. 18, 2005 from International Application No. PCT/US2004/033372.

(Continued)

*Primary Examiner* — Nicholas P D'Aniello
*Assistant Examiner* — Ling R Zeng
(74) *Attorney, Agent, or Firm* — Weaver Austin Villeneuve & Sampson LLP

(57) ABSTRACT

Aqueous Li/Air secondary battery cells are configurable to achieve high energy density and prolonged cycle life. The cells include a protected a lithium metal or alloy anode and an aqueous catholyte in a cathode compartment. The aqueous catholyte comprises an evaporative-loss resistant and/or polyprotic active compound or active agent that partakes in the discharge reaction and effectuates cathode capacity for discharge in the acidic region. This leads to improved performance including one or more of increased specific energy, improved stability on open circuit, and prolonged cycle life, as well as various methods, including a method of operating an aqueous Li/Air cell to simultaneously achieve improved energy density and prolonged cycle life.

31 Claims, 2 Drawing Sheets

(56) References Cited

U.S. PATENT DOCUMENTS

| | | | |
|---|---|---|---|
| 3,703,415 A | 11/1972 | Mitoff et al. |
| 3,783,026 A | 1/1974 | Kordesch |
| 3,912,536 A | 10/1975 | Galli et al. |
| 3,953,566 A | 4/1976 | Gore |
| 3,976,509 A | 8/1976 | Tsai et al. |
| 4,007,057 A | 2/1977 | Littauer et al. |
| 4,091,182 A | 5/1978 | Farrington et al. |
| 4,100,238 A | 7/1978 | Shinomura |
| 4,162,202 A | 7/1979 | Dey |
| 4,163,084 A | 7/1979 | Tsai et al. |
| 4,187,390 A | 2/1980 | Gore |
| 4,210,707 A | 7/1980 | Farrington |
| 4,402,995 A | 9/1983 | Fleischer |
| 4,405,416 A | 9/1983 | Raistrick et al. |
| 4,414,293 A | 11/1983 | Joy et al. |
| 4,429,000 A | 1/1984 | Naka et al. |
| 4,504,561 A | 3/1985 | Winsel |
| 4,539,256 A | 9/1985 | Shipman |
| 4,726,989 A | 2/1988 | Mrozinski |
| 4,833,048 A | 5/1989 | De Jonghe et al. |
| 4,916,036 A | 4/1990 | Cheiky |
| 4,917,974 A | 4/1990 | Visco et al. |
| 4,981,672 A | 1/1991 | De Neufville et al. |
| 4,985,317 A | 1/1991 | Adachi et al. |
| 5,002,843 A | 3/1991 | Cieslak et al. |
| 5,035,963 A | 7/1991 | Plichta |
| 5,100,523 A | 3/1992 | Helms et al. |
| 5,108,856 A | 4/1992 | Shuster |
| 5,162,175 A | 11/1992 | De Jonghe et al. |
| 5,166,011 A | 11/1992 | Rao et al. |
| 5,198,081 A | 3/1993 | Kanoh et al. |
| 5,213,908 A | 5/1993 | Hagedorn |
| 5,314,765 A | 5/1994 | Bates |
| 5,336,384 A | 8/1994 | Tsou et al. |
| 5,338,625 A | 8/1994 | Bates et al. |
| 5,342,710 A | 8/1994 | Koksbang |
| 5,387,479 A | 2/1995 | Koksbang |
| 5,409,786 A | 4/1995 | Bailey |
| 5,427,873 A | 6/1995 | Shuster |
| 5,455,126 A | 10/1995 | Bates et al. |
| 5,506,068 A | 4/1996 | Dan et al. |
| 5,510,209 A | 4/1996 | Abraham et al. |
| 5,512,147 A | 4/1996 | Bates et al. |
| 5,516,598 A | 5/1996 | Chu et al. |
| 5,523,179 A | 6/1996 | Chu |
| 5,525,442 A | 6/1996 | Shuster |
| 5,532,077 A | 7/1996 | Chu |
| 5,567,210 A | 10/1996 | Bates et al. |
| 5,569,520 A | 10/1996 | Bates |
| 5,582,623 A | 12/1996 | Chu |
| 5,597,660 A | 1/1997 | Bates et al. |
| 5,612,152 A | 3/1997 | Bates |
| 5,648,187 A | 7/1997 | Skotheim |
| 5,652,068 A | 7/1997 | Shuster et al. |
| 5,665,481 A | 9/1997 | Shuster et al. |
| 5,686,201 A | 11/1997 | Chu |
| 5,693,212 A | 12/1997 | Mazanec et al. |
| 5,696,201 A | 12/1997 | Cavalloni et al. |
| 5,702,995 A | 12/1997 | Fu |
| 5,789,108 A | 8/1998 | Chu |
| 5,814,420 A | 9/1998 | Chu |
| 5,882,812 A | 3/1999 | De Jonghe et al. |
| 5,961,672 A | 10/1999 | Skotheim et al. |
| 6,017,651 A | 1/2000 | Chu et al. |
| 6,025,094 A | 2/2000 | Visco et al. |
| 6,030,720 A | 2/2000 | Chu et al. |
| 6,030,909 A | 2/2000 | Fu |
| 6,066,417 A | 5/2000 | Cho et al. |
| 6,068,950 A | 5/2000 | Gan et al. |
| 6,096,447 A | 8/2000 | Gan et al. |
| 6,110,236 A | 8/2000 | Chu et al. |
| 6,146,787 A | 11/2000 | Harrup et al. |
| 6,165,644 A | 12/2000 | Chu et al. |
| 6,183,901 B1 | 2/2001 | Ying et al. |
| 6,198,701 B1 | 3/2001 | De Jonghe et al. |
| 6,200,701 B1 | 3/2001 | Gan et al. |
| 6,200,704 B1 | 3/2001 | De Jonghe et al. |
| 6,203,942 B1 | 3/2001 | Gan et al. |
| 6,210,832 B1 | 4/2001 | Chu et al. |
| 6,214,061 B1 | 4/2001 | Visco et al. |
| 6,224,744 B1 | 5/2001 | Casado et al. |
| 6,225,002 B1 | 5/2001 | Chu et al. |
| 6,228,527 B1 | 5/2001 | Medeiros et al. |
| 6,242,135 B1 | 6/2001 | Mushiake |
| 6,248,481 B1 | 6/2001 | De Jonghe et al. |
| 6,274,269 B1 | 8/2001 | Gan et al. |
| 6,280,598 B1 | 8/2001 | Barton et al. |
| 6,296,958 B1 | 10/2001 | Pinto et al. |
| 6,315,881 B1 | 11/2001 | Fu |
| 6,358,643 B1 | 3/2002 | Katz et al. |
| 6,358,651 B1 | 3/2002 | Chen et al. |
| 6,376,123 B1 | 4/2002 | Chu |
| 6,391,492 B1 | 5/2002 | Kawakami et al. |
| 6,402,795 B1 | 6/2002 | Chu et al. |
| 6,413,284 B1 | 7/2002 | Chu et al. |
| 6,413,285 B1 | 7/2002 | De Jonghe et al. |
| 6,432,584 B1 | 8/2002 | Visco et al. |
| 6,475,677 B1 | 11/2002 | Inda et al. |
| 6,485,622 B1 | 11/2002 | Fu |
| 6,489,055 B1 | 12/2002 | Ichihashi et al. |
| 6,495,285 B2 | 12/2002 | Gan et al. |
| 6,511,772 B2 | 1/2003 | Gan et al. |
| 6,537,698 B2 | 3/2003 | Gan et al. |
| 6,537,701 B1 | 3/2003 | Chu et al. |
| 6,562,514 B1 * | 5/2003 | Kazacos ............... H01M 8/188 429/188 |
| 6,632,573 B1 | 10/2003 | Nimon et al. |
| 6,723,140 B2 | 4/2004 | Chu et al. |
| 6,737,197 B2 | 5/2004 | Chu et al. |
| 6,766,817 B2 | 7/2004 | Da Silva |
| 6,770,187 B1 | 8/2004 | Putter et al. |
| 6,797,428 B1 | 9/2004 | Skotheim et al. |
| 6,835,492 B2 | 12/2004 | Cho et al. |
| 6,911,280 B1 | 6/2005 | De Jonghe et al. |
| 6,955,866 B2 | 10/2005 | Nimon et al. |
| 6,991,662 B2 | 1/2006 | Visco et al. |
| 7,070,632 B1 | 7/2006 | Visco et al. |
| 7,211,351 B2 | 5/2007 | Klaassen |
| 7,211,532 B2 | 5/2007 | Fu |
| 7,247,408 B2 | 7/2007 | Skotheim |
| 7,282,295 B2 | 10/2007 | Visco et al. |
| 7,282,296 B2 | 10/2007 | Visco et al. |
| 7,282,302 B2 | 10/2007 | Visco et al. |
| 7,344,804 B2 | 3/2008 | Klaassen |
| 7,390,591 B2 | 6/2008 | Visco et al. |
| 7,432,017 B2 | 10/2008 | Visco et al. |
| 7,491,458 B2 | 2/2009 | Visco et al. |
| 7,608,178 B2 | 10/2009 | De Jonghe et al. |
| 7,645,543 B2 | 1/2010 | Visco et al. |
| 7,666,233 B2 | 2/2010 | Visco et al. |
| 7,829,212 B2 | 11/2010 | Visco et al. |
| 7,901,658 B2 | 3/2011 | Weppner et al. |
| 8,048,571 B2 | 11/2011 | Visco et al. |
| 8,182,943 B2 | 5/2012 | Visco et al. |
| 8,323,820 B2 | 12/2012 | Visco et al. |
| 8,334,075 B2 | 12/2012 | Visco et al. |
| 8,389,147 B2 | 3/2013 | Visco et al. |
| 8,455,131 B2 | 6/2013 | Visco et al. |
| 8,658,304 B2 | 2/2014 | Visco et al. |
| 8,673,477 B2 | 3/2014 | Visco et al. |
| 8,932,771 B2 | 1/2015 | Visco et al. |
| 9,287,573 B2 | 3/2016 | Visco et al. |
| 2001/0014420 A1 | 8/2001 | Takeuchi et al. |
| 2001/0041294 A1 | 11/2001 | Chu et al. |
| 2002/0012845 A1 | 1/2002 | Choi et al. |
| 2002/0012846 A1 | 1/2002 | Skotheim et al. |
| 2002/0034688 A1 | 3/2002 | Chu et al. |
| 2002/0068220 A1 | 6/2002 | Wyler |
| 2002/0102465 A1 | 8/2002 | Chen et al. |
| 2002/0106563 A1 | 8/2002 | Okawa |
| 2003/0124433 A1 | 7/2003 | Kim |
| 2004/0121227 A1 * | 6/2004 | Cheng ............... H01M 8/0293 429/101 |
| 2004/0126653 A1 | 7/2004 | Visco et al. |

(56) References Cited

U.S. PATENT DOCUMENTS

| | | | |
|---|---|---|---|
| 2004/0142244 A1 | 7/2004 | Visco et al. | |
| 2004/0185334 A1 | 9/2004 | Imamoto | |
| 2004/0191617 A1 | 9/2004 | Visco et al. | |
| 2004/0197641 A1 | 10/2004 | Visco et al. | |
| 2005/0100792 A1 | 5/2005 | Visco et al. | |
| 2005/0100793 A1 | 5/2005 | Jonghe et al. | |
| 2005/0175894 A1 | 8/2005 | Visco et al. | |
| 2005/0186469 A1 | 8/2005 | De Jonghe et al. | |
| 2005/0208353 A1 | 9/2005 | Johnson | |
| 2006/0063051 A1 | 3/2006 | Jang | |
| 2006/0078790 A1 | 4/2006 | Nimon et al. | |
| 2006/0083986 A1* | 4/2006 | Li et al. | 429/218.1 |
| 2006/0183011 A1 | 8/2006 | Mittelsteadt et al. | |
| 2006/0183022 A1* | 8/2006 | Takahashi et al. | 429/213 |
| 2007/0037058 A1 | 2/2007 | Visco et al. | |
| 2007/0051620 A1 | 3/2007 | Visco et al. | |
| 2007/0087269 A1 | 4/2007 | Inda | |
| 2007/0117007 A1* | 5/2007 | Visco et al. | 429/144 |
| 2007/0117026 A1 | 5/2007 | Kumar et al. | |
| 2007/0148533 A1 | 6/2007 | Anglin et al. | |
| 2007/0172739 A1 | 7/2007 | Visco et al. | |
| 2007/0231704 A1 | 10/2007 | Inda | |
| 2007/0259234 A1 | 11/2007 | Chua et al. | |
| 2008/0161746 A1 | 7/2008 | Visco et al. | |
| 2009/0239152 A1 | 9/2009 | Katoh | |
| 2009/0311567 A1 | 12/2009 | Visco et al. | |
| 2009/0311596 A1 | 12/2009 | Visco et al. | |
| 2009/0311603 A1 | 12/2009 | Visco et al. | |
| 2009/0311605 A1* | 12/2009 | Visco | H01M 2/1673 429/231.95 |
| 2010/0203383 A1 | 8/2010 | Weppner | |
| 2010/0316931 A1* | 12/2010 | Wieland | 429/492 |
| 2011/0014522 A1 | 1/2011 | Visco et al. | |
| 2011/0053002 A1 | 3/2011 | Yamamura et al. | |
| 2011/0059355 A1 | 3/2011 | Zhang et al. | |
| 2011/0171539 A1* | 7/2011 | Patoux et al. | 429/341 |
| 2011/0244337 A1 | 10/2011 | Ohta et al. | |
| 2011/0269007 A1 | 11/2011 | Visco et al. | |
| 2011/0318648 A1 | 12/2011 | Eitouni et al. | |
| 2012/0009469 A1 | 1/2012 | Visco et al. | |
| 2012/0169016 A1 | 7/2012 | Hisano et al. | |
| 2012/0219842 A1 | 8/2012 | Visco et al. | |
| 2013/0066025 A1 | 3/2013 | Yang et al. | |
| 2013/0122380 A1 | 5/2013 | Visco et al. | |
| 2013/0273419 A1 | 10/2013 | Pistorino et al. | |
| 2013/0295471 A1 | 11/2013 | Visco et al. | |
| 2014/0050994 A1 | 2/2014 | Visco et al. | |
| 2014/0057153 A1 | 2/2014 | Visco et al. | |

FOREIGN PATENT DOCUMENTS

| | | |
|---|---|---|
| EP | 0838441 | 4/1998 |
| EP | 0875951 | 11/1998 |
| EP | 0689260 | 4/1999 |
| EP | 1162675 | 12/2001 |
| EP | 1892780 | 2/2008 |
| EP | 2301105 | 1/2010 |
| JP | 55-081471 | 6/1980 |
| JP | 57-103271 | 6/1982 |
| JP | 57-172660 | 10/1982 |
| JP | 62-243247 | 10/1987 |
| JP | 04-275387 | 9/1992 |
| JP | 05-234578 | 9/1993 |
| JP | 09-320645 | 12/1997 |
| JP | 2002-518796 | 6/2002 |
| JP | 2002-528866 | 9/2002 |
| JP | 2002-289266 | 10/2002 |
| JP | 2003-217662 | 7/2003 |
| JP | 2003-346862 | 12/2003 |
| JP | 2004-504933 | 2/2004 |
| JP | 2005-503920 | 2/2005 |
| JP | 2007-513464 | 5/2007 |
| JP | 56-27576 | 9/2011 |
| KR | 10-2001-0024927 | 3/2001 |
| WO | 98/28811 | 7/1998 |
| WO | 99/57770 | 11/1999 |
| WO | 02/50933 | 6/2002 |
| WO | 2005/038953 | 4/2005 |
| WO | 2005/038962 | 4/2005 |
| WO | 2005/083829 | 9/2005 |
| WO | 2007/021717 | 2/2007 |
| WO | 2010/005686 | 1/2010 |

OTHER PUBLICATIONS

De Jonghe et al., "Chemical Protection of a Lithium Surface", PolyPlus Battery Company, U.S. Appl. No. 11/092,781, filed Mar. 28, 2005, pp. 1-34.
U.S. Appl. No. 11/092,781, Office Action mailed Jun. 16, 2006.
U.S. Appl. No. 11/092,781, Office Action mailed Feb. 1, 2007.
U.S. Appl. No. 11/092,781, Office Action mailed Jun. 25, 2007.
U.S. Appl. No. 11/092,781, Office Action mailed Feb. 22, 2008.
U.S. Appl. No. 10/686,189, Office Action mailed Oct. 12, 2006.
U.S. Appl. No. 10/686,189, Office Action mailed Apr. 11, 2007.
U.S. Appl. No. 10/731,771, Office Action mailed Sep. 28, 2006.
U.S. Appl. No. 10/731,771, Office Action mailed Mar. 16, 2007.
U.S. Appl. No. 10/772,157, Office Action mailed Nov. 1, 2007.
U.S. Appl. No. 10/772,157, Office Action mailed Feb. 6, 2008.
U.S. Appl. No. 10/772,157, Office Action mailed Jul. 11, 2008.
U.S. Appl. No. 10/772,157, Office Action mailed Dec. 30, 2008.
U.S. Appl. No. 11/824,548, Office Action mailed Mar. 20, 2008.
U.S. Appl. No. 11/824,548, Office Action mailed Jan. 26, 2009.
U.S. Appl. No. 10/825,587, Office Action mailed Jun. 25, 2007.
U.S. Appl. No. 10/825,587, Office Action mailed Apr. 1, 2008.
U.S. Appl. No. 10/825,587, Office Action mailed Jun. 5, 2008.
U.S. Appl. No. 10/825,587, Office Action mailed Oct. 16, 2008.
U.S. Appl. No. 10/772,228, Office Action mailed Sep. 21, 2007.
U.S. Appl. No. 10/772,228, Office Action mailed Nov. 28, 2006.
U.S. Appl. No. 10/824,944, Office Action mailed Mar. 12, 2007.
U.S. Appl. No. 10/824,944, Office Action mailed Sep. 7, 2006.
U.S. Appl. No. 10/986,441, Office Action mailed Oct. 20, 2008.
U.S. Appl. No. 11/823,847, "Ionically conductive composites for protection of active metal anodes", Visco et al., filed Jun. 27, 2007.
U.S. Appl. No. 11/823,847, Office Action mailed Sep. 16, 2008.
U.S. Appl. No. 11/823,847, Office Action mailed Apr. 28, 2009.
U.S. Appl. No. 12/649,245, "Active metal / aqueous electrochemical cells and systems", Visco et al., filed Dec. 29, 2009.
U.S. Appl. No. 12/649,245, Office Action mailed Mar. 31, 2010.
U.S. Appl. No. 11/824,574, "Ionically conductive membranes for protection of active metal anodes and battery cells", Visco et al., filed Jun. 29, 2007.
U.S. Appl. No. 11/824,574, Office Action mailed Dec. 31, 2008.
China patent application No. 2003801061464, First Office Action mailed Oct. 27, 2006.
Nippon Telegr & Teleph Corp., "Patent Abstracts of Japan," vol. 008, No. 119 (E-248), Jun. 5, 1984 & JP 59 031573 A, Feb. 20, 1984.
Anders et al., "Plasma is Produced Simply", R&D Research & Development, R&D Magazine, vol. 39, No. 10, Sep. 1997, www.rdmag.com, p. 65.
Steven D. Jones, et al., "Thin film rechargeable Li batteries", 1994, *Solid State Ionics*.
J.B. Bates, et al., "Thin-film rechargeable lithium Sources batteries," 1995, *Journal of Power Sources*.
N. J. Dudney, et al., "Sputtering of lithium compounds for preparation of electrolyte thin films," 1992, *Solid State Ionics*.
J. B. Bates, et al., "Electrical properties of amorphous lithium electrolye thin films," 1992, *Solid State Ionics*.
Xiaohua Yu, et al, "A Stable Thin-Film Lithium Electrolyte: Lithium Phosphorus Oxynitride," 02-97, *J. Electrochem. Soc.*, vol. 144, No. 2.
Fu, Jie, "Fast Li+ Ion Conduction in Li2O—Al2O3—TiO2—SiO2—P2O5 Glass-Ceramics", Journal of the American Ceramics Society, vol. 80, No. 7, Jul. 1997, pp. 1-5.
Aono et al., "Ionic Conductivity of the Lithium Titanium Phosphate $(Li_{1+x}M_xTi_{2-x}(PO_4)_3)$, M = Al, Sc, Y, and La) Systems", Dept. of Industrial Chemistry, pp. 590-591.

(56) References Cited

OTHER PUBLICATIONS

Aono, Hiromichi, "High Li+ Conducting Ceramics", Acc. Chem. Res. vol. 27, No. 9, 1994, pp. 265-270.

Aono, et al., "Ionic Conductivity and Sinterability of Lithium Titanium Phosphate System", Solid State Ionics, 40/41 (1990), pp. 38-42.

Aono, et al., "Electrical properties and crystal structure of solid electrolyte based on lithium hafnium phosphate $LiHf_2 (PO_4)_3$", Solid State Ionics 62 (1993), pp. 309-316.

Aono, et al., "Electrical property and sinterability of $LiTi_2 (PO_4)_3$ mixed with lithium salt ($Li_3PO_4$ or $Li_3BO_3$)", Solid State Ionics 47 (1991) pp. 257-264.

Aono, et al., "Ionic Conductivity of $\beta=Fe_2 (SO_4)_3$ Type $Li_3Cr_2 (PO_4)_3$ Based Electrolyte", Chemistry Letters, 1993, pp. 2033-2036.

Aono, et al., "Ionic Conductivity of $LiTi_2 (PO_4)_3$ Mixed with Lithium Salts", Chemistry Letters, 1990, pp. 331-334.

Fu, Jie, "Superionic conductivity of glass-ceramics in the system $Li_2O$—$Al_2O_3$—$TiO_3$—$P_2O_5$", Solid State Ionics, 96 (1997), pp. 195-200.

Fu, Jie, "Fast Li+ ion conducting glass-ceramics in the system $Li_2O$—$Al_2O_3$—$GeO_2$—$P_2O_5$" Solid State Ionics 104 (1997), pp. 191-194.

Aono, et al., "DC Conductivity of $Li_{1.3}Al_{0.3}Ti_{1.7}(PO_4)_3$" Ceramic with Li Electrodes, Chemistry Letters, 1991, pp. 1567-1570.

Aono, et al., "Electrical Properties of Sintered Lithium Titanium Phosphate Ceramics ($Li_{1+x}M_xTi_{2-x}PO_4)_3, M^{3+}=Al^{3+}$, $Sc^{3+}$, or $Y^{3+}$)", Chemistry Letters, 1990, pp. 1825-1828.

Button, et al., "Structural disorder and enhanced ion transport in amorphous conductors", Solid State Ionics, vols. 9-10, Part 1, Dec. 1983, pp. 585-592 (abstract).

Shuster, Nicholas, "LithiumWater Power Source for Low Power—Long Duration Undersea Applications", Westinghouse Electric Corporation, 1990 IEEE, pp. 118-123.

VanVoorhis, et al., "Evaluation of Air Cathodes for Lithium/Air Batteries", Electrochemical Society Proceedings vol. 98-16, 1999, pp. 383-390.

Blurton et al., "Metal/Air Batteries: Their Status and Potential—A Review", Journal of Power Sources, 4, (1979), pp. 263-279.

J. Read, "Characterization of the Lithium/Oxygen Organic Electrolyte Battery", Journal of the Electrochemical Society, 149 (9) (2002), pp. A1190-A1195.

Abraham et al., "A Polymer Electrolyte-Based Rechargeable Lithium/Oxygen Battery", Technical Papers, Electrochemical Science and Technology, J. Electrochem. Soc., vol. 143, No. 1, Jan. 1996, pp. 1-5.

Kessler, et al., "Large Microsheet Glass for 40-in. Class PALC Displays", 1997, FMC2-3, pp. 61-63.

Feng et al., "Electrochemical behavior of intermetallic-based metal hydrides used in Ni/metal hydride (Mh) batteries: a review", International Journal of Hydrogen Energy, 26 (2001), pp. 725-734.

Iwakura et al., "All solid-state nickel/metal hydride battery with a proton-conductive phosphoric acid-doped silica gel electrolyte", Electrochimica Acta 48 (2003), pp. 1499-1503.

Li et al., "Lithium-Ion Cells with Aqueous Electrolytes", J. Electrochem. Soc., vol. 142, No. 6, Jun. 1995, pp. 1742-1746.

Zhang et al., "Electrochemical Lithium Intercalation in $VO_2(B)$ in Aqueous Electrolytes", J. Electrochem. Soc., vol. 143, No. 9, Sep. 1996, pp. 2730-2735.

Urquidi-Mcdonald, Mirna, "Hydrogen storage and semi-fuel cells", http://engr.psu.edu/h2e/Pub/Macdonald1.htm, (downloaded Jan. 27, 2004, 3 pages).

Urquidi-Mcdonald, et al., "Lithium/poly(organophosphazene) membrane anodes in KOH and seawater", Electrochimica Acta 47, (2002), pp. 2495-2503.

Nimon et al., "Stability of Lithium Electrode in Contact with Glass Electrolytes", SSI-14, Jun. 22-27, 2003, Monterey, CA. (conference poster).

Nimon et al., "Stability of Lithium Electrode in Contact with Glass Electrolytes", SSI-14 Conference, Monterey, CA, Jun. 22, 2003, Abstract of Poster.

Inaguma et al., "High Ionic Conductivity in Lithium Lanthanum Titanate", Solid State Communications, vol. 86, No. 10, pp. 689-693, 1993.

Kobayashi et al., "All-solid-state lithium secondary battery with ceramic-polymer composite electrolyte", Solid State Ionics 152-153 (2002) 137-142.

Will et al., "Primary Sodium Batteries with Beta-Alumina Solid Electrolyte", J. Electrochemical Science and Technology, Apr. 1975, vol. 122, No. 4, pp. 457-461.

EP patent application No. 03809186.4, Examination Report dated Mar. 21, 2006.

International patent application No. PCT/US2004/033371, International Search Report dated Mar. 6, 2006.

International patent application No. PCT/US2004/033424, International Search Report dated Jan. 6, 2006.

Galbraith, A.D., "The lithium-water-air battery for automotive propulsion", XP002355800, retrieved from STN Database accession No. 1979:106901 abstract and Symp. Int. Veh. Electr., RAPP, 4$^{th}$ vol. 1, paper 32.4, 23 pp., Publisher: Electr. Veh. Counc., New York, N.Y. Conden: 39UPAD, 1976.

International patent application No. PCT/US2004/033361, International Search Report and Written Opinion dated Jan. 16, 2006.

International patent application No. PCT/US2004/033424, International Search Report and Written Opinion dated Mar. 6, 2006.

West, et al., "Chemical stability enhancement of lithium conducting solid electrolyte plates using sputtered LiPON thin films", Journal of Power Sources, vol. 126, Issues 1-2, pp. 1-272 (Feb. 16, 2004).

International patent application No. PCT/US2004/033424, Invitation to Pay Additional Fees dated Jan. 6, 2006.

EP patent application No. 04794699.1, Examination Report dated May 31, 2007.

CN patent application No. 200480037293.5, Office Action mailed Aug. 22, 2008.

EP patent application No. 04794699.1, Examination Report mailed Aug. 5, 2008.

AU patent application No. 2003301383, Examination Report mailed Sep. 29, 2008.

CN patent application No. 200480042697.3, Office Action mailed Feb. 15, 2008.

U.S. Appl. No. 11/245,472, Office Action mailed Jul. 24, 2008.

CN patent application No. 200480042697.3, Office Action mailed Dec. 19, 2008.

Thokchom, Joykumar S., et al., *Water Durable Lithium Ion Conducting Composite Membranes from the the $Li_2O$—$Al_2O_3$-$TiO_2$—$P_2O_5$ Glass-Ceramic, Journal of The Electrochemical Society*, 154 (4), 2007, pp. A331-A336.

U.S. Appl. No. 11/245,472, Office Action mailed Jan. 8, 2009.

U.S. Appl. No. 11/824,579, Office Action mailed Jan. 29, 2009.

CN patent application No. 200480042697.3, Office Action mailed Jun. 5, 2009.

U.S. Appl. No. 11/245,472, Office Action mailed Jul. 8, 2009.

AU patent application No. 2004306866, Exam Report mailed Apr. 9, 2009.

AU patent application No. 2004316638, Office Action mailed Aug. 3, 2009.

International patent application No. PCT/US06/48755, International Search Report mailed Apr. 7, 2008.

International patent application No. PCT/US06/48755, Written Opinion mailed Apr. 7, 2008.

Ogasawara T. et al., "Rechargeable $Li_2O_2$ Electrode for Lithium Batteries", J. Am. Chem. Soc. 128(4), 2006, pp. 1390-1393.

Foster D.L. et al., "Ceramic Membranes for Lithium Batteries", Proceeding of the 42$^{nd}$ Power Sources Conference, Jun. 2006, P2.14.

Read J., "Electrolyte Formulation and Temperature Performance of the $Li/O_2$ Battery", Proceeding of the 9$^{th}$ Electrochemical Power Sources R&D Symposium, Jun. 2005, 15 pages.

EP patent application No. 04794699.1, Notice of Allowance mailed Jun. 10, 2009.

U.S. Appl. No. 12/334,116, Office Action mailed Oct. 27, 2009.

EP patent application No. 03809186.4, Examination Report mailed Nov. 11, 2009.

U.S. Appl. No. 11/245,472, Office Action mailed Feb. 4, 2010.

(56) References Cited

OTHER PUBLICATIONS

U.S. Appl. No. 12/475,403, Office Action mailed Feb. 8, 2010.
International patent application No. PCT/US2009/047278, International Search Report and Written Opinion dated Jan. 21, 2010.
AU patent application No. 2003301383, Notice of Acceptance mailed Nov. 26, 2009.
Visco, S.J. et al., "Lithium-Air", Encyclopedia of Electrochemical Power Sources, Dyer (editor), Elsevier, 2009, ISBN: 9780444527455, pp. 376-383.
U.S. Appl. No. 10/824,944, Notice of Allowance mailed Jul. 31, 2007.
U.S. Appl. No. 10/772,157, Notice of Allowance mailed Sep. 17, 2009.
U.S. Appl. No. 11/824,548, Notice of Allowance mailed Dec. 17, 2009.
U.S. Appl. No. 12/649,245, Office Action mailed Jul. 19, 2010.
U.S. Appl. No. 12/649,245, Office Action mailed Nov. 30, 2010.
U.S. Appl. No. 12/649,245, Office Action mailed May 2, 2011.
U.S. Appl. No. 12/649,245, Notice of Allowance mailed Sep. 14, 2011.
U.S. Appl. No. 11/824,597, Notice of Allowance mailed Sep. 9, 2010.
U.S. Appl. No. 11/612,741, Office Action mailed Nov. 29, 2010.
U.S. Appl. No. 11/612,741, Office Action mailed Jul. 22, 2011.
U.S. Appl. No. 11/612,741, Notice of Allowance mailed Feb. 3, 2012.
AU patent application No. 2004306866, Notice of Acceptance mailed Jun. 17, 2010.
CA patent application No. 2,542,304, Examination Report mailed Apr. 4, 2011.
CN patent application No. 200480037293.5, Office Action mailed Jan. 29, 2010.
CN patent application No. 200480037293.5, Office Action mailed Jun. 24, 2010.
JP patent application No. 2006-535572, Office Action mailed Jun. 21, 2011.
KR patent application No. 2006-7007309, Office Action mailed Jul. 27, 2011.
CA patent application No. 2,555,637, Exam Report mailed May 10, 2011.
CN patent application No. 200910174918.7, Office Action mailed Oct. 19, 2011.
EP patent application No. 04794655.3, Examination Report mailed Apr. 22, 2010.
JP patent application No. 2006-552102, Office Action mailed Jul. 5, 2011.
KR patent application No. 10-2006-7017692, Notice to Submit Response mailed May 13, 2011.
U.S. Appl. No. 12/484,063, Office Action mailed Feb. 6, 2012.
KR patent application No. 9-5-2012-016417008, Office Action mailed Mar. 21, 2012.
CA patent application No. 2,542,304, Exam Report mailed Apr. 3, 2012.
U.S. Appl. No. 12/484,079, Office Action mailed Apr. 27, 2012.
U.S. Appl. No. 13/236,428, Notice of Allowance mailed Apr. 25, 2012.
U.S. Appl. No. 12/888,154, Office Action mailed May 3, 2012.
U.S. Appl. No. 12/484,081, Office Action mailed Jun. 21, 2012.
U.S. Appl. No. 12/484,063, Office Action mailed Aug. 1, 2012.
U.S. Appl. No. 12/484,065, Office Action mailed Aug. 9, 2012.
U.S. Appl. No. 13/453,964, Notice of Allowance mailed Aug. 14, 2012.
U.S. Appl. No. 12/484,063, Notice of Allowance mailed Sep. 14, 2012.
U.S. Appl. No. 12/888,154, Notice of Allowance mailed Aug. 20, 2012.
U.S. Appl. No. 13/464,835, Office Action mailed Sep. 25, 2012.
JP patent application No. 2006-552102, Office Action mailed Sep. 25, 2012.
KR patent application No. 9-5-2012-016417008, Notice of Allowance mailed Nov. 23, 2012.
U.S. Appl. No. 12/484,081, Notice of Allowance mailed Jan. 18, 2013.
U.S. Appl. No. 12/484,065, Office Action mailed Feb. 19, 2013.
CA patent application No. 2,542,304, Office Action mailed Jan. 30, 2013.
JP patent application No. 2006-535572, Decision to Grant a Patent mailed Sep. 4, 2012.
CA patent application No. 2,555,637, Notice of Allowance mailed Apr. 17, 2012.
CN patent application No. 200980131906.4, First Office Action mailed Dec. 4, 2012.
MX patent application No. 2010/013888, First Official Action mailed Jan. 25, 2013.
U.S. Appl. No. 12/484,079, Office Action mailed Nov. 29, 2012.
U.S. Appl. No. 12/973,779, Office Action mailed Dec. 19, 2012.
WO patent application No. PCT/US2011/030969, International Search Report and Written Opinion mailed Jan. 11, 2012.
U.S. Appl. No. 12/484,079, Notice of Allowance mailed Apr. 17, 2013.
U.S. Appl. No. 13/464,835, Office Action mailed May 2, 2013.
U.S. Appl. No. 12/973,779, Office Action mailed May 31, 2013.
U.S. Appl. No. 12/484,065, Office Action mailed Jun. 17, 2013.
EP patent application No. 09794889, Supplemental Search Report mailed May 21, 2013.
U.S. Appl. No. 13/673,789, Notice of Allowance mailed Oct. 1, 2013.
U.S. Appl. No. 12/484,065, Notice of Allowance mailed Oct. 4, 2013.
MX patent application No. 2010/013888, Office Action mailed Jul. 22, 2013.
CN patent application No. 200980131906.4, Office Action mailed Jun. 26, 2013.
JP patent application No. 2011-513742, Office Action mailed Oct. 8, 2013.
JP patent application No. 2006-552102, Office Action mailed Nov. 26, 2013.
JP patent application No. 2011-513742, Notification of Reasons for Rejection mailed Feb. 4, 2014.
U.S. Appl. No. 14/156,267, "Protected lithium electrodes having a porous electrolyte interlayer and associated battery cells," Visco et al., filed Jan. 15, 2014.
WO2009/003695, machine English translation.
WO2013/010692, machine English translation.
JP patent application No. 2011-513742, Office Action mailed Feb. 4, 2014.
MX patent application No. 2010/013888. Office Action mailed Feb. 20, 2014.
BR patent application No. P10415312.0, Search and Exam Report mailed Mar. 6, 2014.
EP patent application No. 09794889.7, Office Action mailed Apr. 10, 2014.
De Jonghe, Lutgard C. et al., "Status of the development of Li-air batteries," presented at Topsøe Catalyst Forum, Munkerupgaard, Aug. 25-26, 2011.
U.S. Appl. No. 13/525,128, Office Action mailed May 14, 2014.
WO patent application No. PCT/US2012/051485, International Search Report and Written Opinion mailed Mar. 4, 2013.
Visco, Steven J. et al., "Aqueous and nonaqueous lithium-air batteries enabled by water-stable lithium metal electrodes," Solid State Electrochem (2014) 18:1443-1456.
KR patent application No. 9-52014-080305973, Office Action mailed Nov. 24, 2015.
U.S. Appl. No. 13/525,128, Notice of Allowance mailed Nov. 21, 2014.
KR patent application No. 9-52014-080305973, Office Action mailed Nov. 24, 2014.
CA patent application No. 2,727,266, Office Action mailed Dec. 15, 2014.
U.S. Appl. No. 13/938,029, Office Action mailed Jun. 11, 2015.
EP patent application No. 09794889.7, Exam Report mailed Aug. 5, 2015.

(56) References Cited

OTHER PUBLICATIONS

U.S. Appl. No. 13/938,029, Notice of Allowance mailed Dec. 22, 2015.
U.S. Appl. No. 14/994,011, Office Action mailed Jul. 1, 2016.

* cited by examiner

AQUEOUS LITHIUM AIR BATTERIES

CROSS-REFERENCE TO RELATED APPLICATIONS

This application claims priority to U.S. Provisional Patent Application No. 61/525,634 filed Aug. 19, 2011, titled AQUEOUS LITHIUM AIR BATTERIES, which is incorporated herein by reference in its entirety and for all purposes.

STATEMENT OF GOVERNMENT SUPPORT

This invention was made with Government support under Award No.: DE-AR0000061 awarded by the Advanced Research Projects Agency-Energy (ARPA-E), U.S. Department of Energy. The Government has certain rights in this invention.

BACKGROUND OF THE INVENTION

1. Field of the Invention

The present invention relates generally to alkali metal/oxygen electrochemical energy storage cells and in particular embodiments to secondary Li/Air battery cells and aqueous catholytes for use therein as well as to methods of operating said cells.

2. Related Art

The large free energy of the reaction between lithium and oxygen has attracted the interest of battery researchers for decades. At a nominal potential of about 3 volts, the theoretical specific energy for a Li/Air battery in a non-aqueous electrolyte is over 11,000 Wh/kg for the reaction forming $Li_2O_2$ ($2Li+O_2=Li_2O_2$), and in aqueous electrolytes 5,000 Wh/kg for the reaction forming LiOH ($Li+\frac{1}{4}O_2+\frac{1}{2}H_2O=LiOH$), both systems rivaling the energy density for hydrocarbon fuel cells and far exceeding lithium ion battery chemistry. Indeed, as evidenced by the development and commercial success of the Zn/Air battery, the high specific energy for metal/air chemistries has been long recognized. Li/Air chemistry, however, introduces additional challenges.

Today it is generally recognized that there are two basic approaches to Li/Air battery development depending on whether the electrolyte in contact with the cathode is aqueous or non-aqueous (i.e., aqueous Li/Air or non-aqueous Li/Air).

Abraham et al. were the first to describe a non-aqueous Li/Air battery using organic carbonate electrolytes commonly employed for lithium batteries. Thereafter, in U.S. Pat. Nos. 7,282,295 and 7,645,543 to Visco et al., for example, improved performance is described based on electrolyte formulations other than carbonates, and more generally electrolytes that, albeit unstable in contact with lithium, were enabled for use in a Li/Air cell because the lithium anode was isolated from contact with the electrolyte by a protective membrane architecture. Notwithstanding those improvements, non-aqueous Li/Air cells can be plagued by the formation of a copious amount of insoluble discharge product that can clog cathode pores, severely limiting both discharge capacity and cycling stability.

Relative to its non-aqueous counterpart, aqueous Li/Air has its own set of unique challenges. Most prominent of these is the reactivity of bare lithium metal in contact with water. As described in U.S. Pat. Nos. 7,645,543 and 7,282,295, for example, practical aqueous Li/Air batteries depend upon stabilizing the lithium anode (e.g., lithium metal) in the presence of water and oxygen. Protected lithium electrodes suitable for use in aqueous Li/Air batteries are described in U.S. Pat. Nos. 7,282,295 and 7,645,543, for example. The protected lithium electrodes have protective membranes and protective membrane architectures that are stable in water environments and are capable of discharging into aqueous catholytes. For cells employing a protected lithium electrode, the aqueous electrolyte in contact with the cathode does not contact the lithium anode, and for this reason is generally referred to herein and elsewhere as catholyte, and when the catholyte solvent system is primarily composed of water it is generally referred to as an aqueous catholyte.

Today it is generally accepted that in practice, at least for most applications, the lithium anode in an aqueous Li/Air battery cell must be protected against direct contact with the aqueous electrolyte.

For Li/Air, the type of catholyte (e.g., aqueous or non-aqueous) employed, and its particular formulation, is determinative of the chemistry taking place at the cathode, and ultimately overall cell performance. The development and search for improved aqueous catholytes for Li/Air batteries is not simple, the requirements are several-fold, and the results can often be unpredictable.

SUMMARY OF THE INVENTION

Novel catholyte formulations described herein are suitable for use in aqueous secondary Li (or other alkali metal)/Air battery cells and improve upon a number of cell performance attributes including cycle life and specific energy.

Alkali metal/oxygen electrochemical energy storage cells having aqueous catholytes are described. The instant catholytes comprise water and one or more evaporative-loss resistant and/or polyprotic active compounds dissolved in water that partake in the discharge reaction and effectuate cathode capacity for discharge in the acidic region. By use of the term acidic region it is meant that portion (or region) of the discharge/charge capacity over which the catholyte has a pH less than 7.

In various embodiments the active compound dissolved in the catholyte is an active proton generator that dissociates over the course of discharge, thus yielding active protons in the catholyte that partake in the cell reaction as the discharge proceeds. Typically the active proton generator is a BrØnsted-Lowry acid. In various embodiments the active proton generator is an organic acid substantially stable against evaporative losses, for example having a vapor pressure lower than that of acetic acid (11.4 mmHg (20° C.)), in particular much lower, such as less than 1 mmHg or less than $10^{-3}$ mmHg, for example malonic acid ($3.2 \times 10^{-5}$ mmHg (25° C.)) or citric Acid ($1.66 \times 10^{-8}$ mmHg (25° C.)), and therefore particularly suitable for use in a Li/Air battery cell in accordance with the present invention. In some embodiments the active proton generator is a polyprotic organic acid, having two or more (e.g., three) acidic protons, and therefore capable of providing additional cathode capacity for discharge in the acidic region without overburdening the weight of the cell. In some embodiments the active compound does not provide an active proton. Instead, the active compound undergoes alkaline hydrolysis via reaction with the alkali that is generated during cell discharge.

In various aspects, the invention provides:
  i) aqueous catholytes for use in alkali metal/oxygen electrochemical energy storage cells, and in particular aqueous Li/Air secondary battery cells;
  ii) alkali metal/oxygen electrochemical energy storage cells comprising the aforementioned inventive aqueous catholytes, and in particular Li/Air secondary batteries wherein the aqueous catholyte is resistant to evaporative losses; and iii) methods, such as:
  a. methods of making the inventive aqueous catholytes and the instant energy storage cells;
  b. methods of tuning the pH of the catholyte to improve, among other parameters, stability of the ion membrane in contact with the catholyte;
  c. a method of operating a secondary $Li/O_2$ battery cell over a broad range of catholyte pH that includes actively operating the cell (e.g., discharging and charging the cell) in both the acidic and basic regions; and
  d. a method for regenerating the catholyte to promote reversibility and high capacity cycling stability, the method involving charging the cell to an acidic state of sufficient acid strength to dissolve and preferably decompose lithium carbonate solid products that may have formed in the basic region, and thus, by this expedient, recover inactivated lithium trapped there within (or as a component of) the carbonate salts.

In accordance with the instant invention, a battery cell structure includes: i) a cathode for electro-reducing/electro-oxidizing molecular oxygen during discharging/charging of the cell; ii) an aqueous catholyte having completely or partially dissolved therein one or more evaporative-loss resistant and/or polyprotic chemically active species or compounds that partake in the discharge/charge reaction; and iii) a protected lithium electrode composed of an electro-active lithium material shielded from contact with the aqueous catholyte by a liquid impervious lithium ion conducting membrane.

The chemically active species may be added to the catholyte to enhance or improve any number of cell characteristics including cathode capacity, reversibility, discharge/charge cycling stability, stability of the solid electrolyte membrane in contact with the catholyte, water management (especially to prevent catholyte dry out in an open to air cell) and/or to generally improve overall cell performance or improve a particular performance parameter during active operation (i.e., during actual discharge and charge) and/or at open circuit during storage prior to initial discharge or at intermittent rest periods over the course of operation. By use of the term "prior to initial discharge" it is meant prior to actively operating the cell, which means prior to the initial passing of electrical current through the cell. For various embodiments when describing the catholyte composition it is important to distinguish between the composition prior to initial discharge and thereafter, since the catholyte composition, including its pH, changes as the discharge and charge proceed.

Briefly, specific functional advantages provided by the chemically active species (or active compound) in the catholyte include one or more of the following, each of which is more fully described throughout the specification:

i) furnishing active protons into the catholyte via dissolution of an active compound that, when dissolved or otherwise, is resistant to evaporative losses and stable in contact with the ion conductive membrane;

ii) simultaneously tuning the pH of the catholyte to enhance stability with the ion conductive membrane while providing active protons for discharge in the acidic regime;

iii) buffering the catholyte pH over a predetermined discharge capacity as a mechanism to defer or lessen cell operation in the basic regime, extend cell capacity derived from the acidic regime;

iv) enabling regeneration of inactivated lithium trapped as an element in a solid phase alkaline discharge products, such as carbonate discharge products, and thus improving reversibility of high capacity Li/Air secondary cells that are operated in both the acidic and basic regimes;

v) simultaneously enhancing chemical stability of the membrane and water management of cells which are operated open to air (e.g., for various embodiments of the instant Li/Air cell).

In various embodiments, aqueous catholytes of the present invention comprise one or more completely or partially dissolved chemical species or compounds that serve to improve one or more Li/Air battery cell performance characteristics or otherwise improve cell operation and/or maintenance. These chemical species include the following classes:

i) mono- and polyprotic organic acids and their acid salts, such as carboxylic acids represented by the general formula:

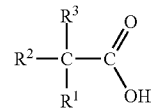

wherein $R^1$ represents an organic radical, $R^2$ represents H or an organic radical; and $R^3$ represents H or an organic radical. The organic radical may contain other carboxylic groups; then, the acid is polyprotic. Examples include malonic acid, glutaric acid and methylsuccinic acid.

ii) functionally substituted carboxylic acids, such as amino acids and hydroxy acids.

iii) carboxylic acid derivatives including acyl halides, anhydrides, esters, amides, nitriles.

iv) lactones;

v) esters of inorganic acids;

vi) sulfur containing organic acids such as sulfonic acids or their derivatives such as sulfonamides;

vii) phenols (optionally substituted and functionalized);

viii) inorganic neutral and acid salts, including mixtures of said salts;
  viii-a) inorganic neutral salts derived from a strong acid and a weak base, e.g. zinc nitrate or magnesium nitrate;
  viii-b) inorganic acid salts, e.g. lithium dihydrogen phosphate and lithium hydrogen selenate;

ix) amphoteric hydroxides;

x) onium salts formed with organic acids xi) onium salts formed with inorganic acids;

Onium salts are of the general formula: $(R_nMH)^+X^-$ wherein R may represent hydrogen, and at least one of the R represents an aliphatic or aromatic optionally substituted organic radical; M represents elements of the nitrogen group, or chalcogen, or halogen; $X^-$ is organic or inorganic acid residue. When M is nitrogen, an onium salt is an aminium salt. An aminium salt where the aminium cation is a primary, secondary, or tertiary ammonium cation is of the general formula $(NHR^1R^2R^3)^+$ wherein $R^1, R^2, R^3$ may represent hydrogen, and at least one of them represents an aliphatic or aromatic optionally substituted organic radical.

xii) supporting salts of the alkali metal (e.g., supporting lithium salts).

In various embodiments the aqueous acidic catholyte of the instant invention comprises water and, dissolved therein, a polyprotic organic acid exemplified by polycarboxylic acid (e.g., diprotic malonic acid and triprotic citric acid). The carboxylic acid may be functionalized or substituted to enhance one or more of the following characteristics: stability to oxidation, acid strength, hygroscopicity of the dissolved acid and/or that of an acid salt that forms as a result of cell discharge or may be loaded in the catholyte as a partially neutralized polyprotic acid and exists in the catholyte as an acid salt or may be loaded in the catholyte as an onium acid or a neutral salt prior to actively operating the cell (i.e., prior to initial discharge).

In various embodiments the aqueous acidic catholyte of the instant invention comprises water and, dissolved therein, a carboxylic acid represented by the general formula

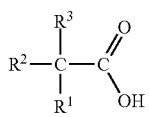
(1)

wherein $R^1$ represents an organic radical, $R^2$ represents H or an organic radical; and $R^3$ represents H or an organic radical.

The carboxylic acid represented by formula (I) may be aliphatic or aromatic, monocarboxylic or polycarboxylic. A single composition of acid may be dissolved in the catholyte; however, combinations of different carboxylic acid compositions are contemplated as well.

With continued reference to formula (I), in various embodiments at least one of $R^1$, $R^2$, and $R^3$ represents an organic radical, and in certain embodiments thereof each of $R^1$, $R^2$, and $R^3$ represents an organic radical. In various preferred embodiments at least one of $R^1$, $R^2$ or $R^3$ contains a carboxyl group.

For instance, in some embodiments, at least one of $R^1$, $R^2$ and $R^3$ represent an organic radical selected from the group consisting of an optionally substituted $C_1$-$C_{10}$ alkyl group, optionally substituted $C_2$-$C_{10}$ alkenyl group, optionally substituted $C_2$-$C_{10}$ alkynyl group. As used herein a "substituted group" is derived from the unsubstituted parent structure in which there has been an exchange of one or more hydrogen atoms for another atom or group. In other embodiments, at least one of $R^1$, $R^2$ and $R^3$ represents an organic radical selected from the group consisting of an optionally substituted $C_4$-$C_{10}$ cycloalkyl, optionally substituted $C_4$-$C_{10}$ cycloalkenyl, and optionally substituted 3-10 membered heterocyclyl. In yet other embodiments at least one of $R^1$, $R^2$ and $R^3$ represent an organic radical selected from the group consisting of an optionally substituted carbo- and heterocyclic 5-10 membered aryl.

In various embodiments the carboxylic acid is malonic acid, glutaric acid, methylsuccinic acid, or some combination thereof (e.g., malonic acid wherein, with reference to formula (I), $R^2$ and $R^3$ represent H and $R^1$ represents carboxyl group).

In various embodiments the aqueous acidic catholyte of the instant invention comprises water and, dissolved therein, a "functionally substituted" carboxylic acid for instance an amino acid or hydroxy acid.

In various embodiments a weak Lewis base having an atom with a lone electron pair reacts with an organic or inorganic mono- or polyprotic acid to form an onium salt, and more particularly an aminium salt, wherein one or more of the acidic protons originally attached to the acid are transferred to one or more weak Lewis base molecules.

In various embodiments the functionally substituted carboxylic acid is an amino acid, such as that containing an amine group, a carboxylic group, and an organic radical. In embodiments the amino acid has the following general formula

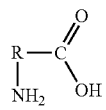

wherein R represents an aliphatic or aromatic optionally substituted organic divalent radical.

Amino acids and the like are advantageous because they may be used in the form of aminium salt where besides the protonated amino group or groups, it also has the acidic proton on the carboxylic group. In the case of such aminium salt, the molecular mass/active proton ratio can increase. For instance, as illustrated below, an amino acid aminium salt consumes two moles of alkali per one mole of amino acid aminium salt,

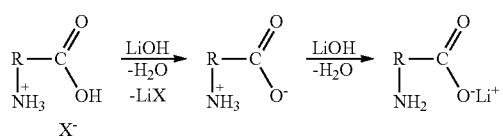

wherein X may be $NO_3^-$, $SO_4^{2-}$, $ClO_4^-$.

Suitable amino acids include glycine, alanine, valine, proline, hydroxyproline, histidine, cysteine, serine, glutamine, lysine, hydroxylysine, arginine, methionine, asparagine, phenylalanine, and aminomalonic acid. For example glycine, alanine, and proline.

In various embodiments the functionally substituted carboxylic acid is a hydroxy acid such as that containing a hydroxy group, a carboxylic group and an organic radical. In embodiments, the hydroxy acid has the following general formula

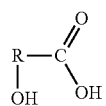

wherein R represents an aliphatic or aromatic organic divalent radical.

Suitable hydroxy carboxylic acids include citric acid, glycolic acid, lactic acid, 2-hydroxypropionic acid, 3-hydroxypropionic acid, 2-hydroxybutyric acid, 3-hydroxybutyric acid, and the like (e.g., citric acid).

In various embodiments the aqueous catholyte of the instant invention comprises water and, dissolved therein, a "carboxylic acid derivative" such as that represented by the general formula

wherein R represents an organic aliphatic or aromatic group that may contain other COX groups if a compound is, for example, a polycarboxylic acid derivative, and X may be, but is not limited to, one of the following
X=Halogen (F, Cl, Br, I)—acyl halides;
X=OC($R^1$)=O—anhydrides where $R^1$=an organic aliphatic or aromatic group;
X=$OR^2$—esters where $R^2$=an organic aliphatic or aromatic group;
X=N($R^3R^4$)—amides where $R^3$, $R^4$=H, an organic aliphatic or aromatic groups.
Or nitrile represented by the general formula

R—CN, where R is an organic aliphatic or aromatic radical.
Accordingly, in various embodiments the carboxylic acid derivative may be an acyl halide, an anhydride, an ester, an amide, or a nitrile (e.g., an ester of carboxylic acid).
Suitable organic esters include those having represented by the following general formula

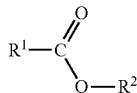

wherein
$R^1$=benzyl, phenyl, —COOR, —CH$_2$COOR, —CH$_2$CH$_2$COOR, —CH$_2$CH$_2$CH$_2$COOR, —CH$_2$CN, —CH$_2$CF$_3$, CCl$_2$, C$_5$H$_{11}$, C$_6$H$_{13}$, etc.;
$R^2$=—CH$_2$—CH$_2$OH, —CH$_2$—CH$_2$OR, —CH$_2$—CH(OH)—CH$_2$OH, —CH$_2$—CH(OR)—CH$_2$OH, —CH$_2$—CH(OH)—CH$_2$OR, —CH$_2$—CH(OR)—CH$_2$OR, —(CH$_2$)$_2$—O—(CH$_2$)$_2$OR;
R=organic aliphatic or aromatic group.
Some of the more preferred esters are diethylene glycol dibenzoate, 2-methoxyethyl cyanoacetate, ethylene glycol monosalicylate, and ethylene brassylate.
When added to the catholyte, esters undergo alkaline hydrolysis (sometimes referred to as saponification) via reaction with the cell discharge product (LiOH), as illustrated below

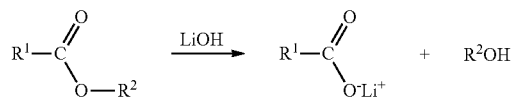

The rate of alkaline hydrolysis relative to that of neutral and acidic hydrolysis that may take place prior to cell discharge depends on substituents $R_1$ and $R_2$. The more electron withdrawing inductive effect of the substituent, the higher the hydrolysis rate becomes. Substituents are generally chosen to decrease (e.g., minimize) the rate of neutral and acidic hydrolysis and increase (e.g., maximize) the rate of alkaline hydrolysis.
In various embodiments the carboxylic acid derivative is a lactone, such as those represented by the general formula

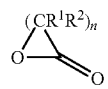

wherein n may be 2 or 4.
wherein $R^1$ represents an aliphatic or aromatic optionally substituted organic radical; and
wherein $R^2$ represents an aliphatic or aromatic optionally substituted organic radical.
Lactones dissolved in water may be in equilibrium with the corresponding hydroxy acid as illustrated below. Equilibrium depends on pH and the substituent groups $R_1$, $R_2$. At high pH values equilibrium may be dramatically shifted toward lactone cycle opening.

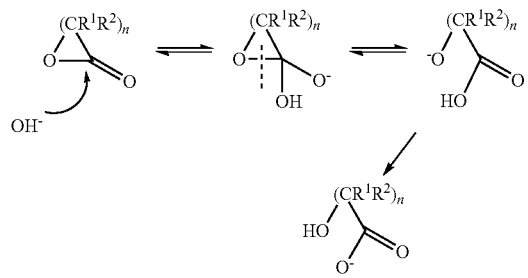

Suitable lactones include γ-butyrolactone, δ-gluconolactone, and glutaric anhydride.
In various embodiments the aqueous catholyte of the instant invention comprises water and, completely or partially dissolved therein, a phosphate ester, such as those represented by the general formula

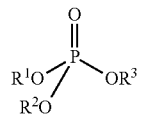

wherein: $R^1$=aliphatic or aromatic group; $R^2$, $R^3$ is an aliphatic or aromatic optionally substituted organic radical, or hydrogen atom.
Phosphate triesters ($R^2$, $R^3$ is an aliphatic or aromatic optionally substituted organic radical) and diesters (one of the $R^2$, $R^3$ is hydrogen atom and the other one is an aliphatic or aromatic optionally substituted organic radical) are particularly suitable in some embodiments.
Particularly suitable phosphate triesters include trimethyl phosphate, triethyl phosphate, tripropyl phosphate, tributyl phosphate, and tris(2-butoxyethyl) phosphate.
In various embodiments the aqueous catholyte of the instant invention comprises water and, completely or partially dissolved therein, an ester of inorganic acid represented by the general formula X(OR)$_n$.
wherein R is an aliphatic or aromatic optionally substituted organic radical; and

X=N(=O)$_2$, S(=O)$_2$, P=O n is basicity of an acid from which the ester was derived
In various embodiments the aqueous catholyte of the instant invention comprises water and, completely or partially dissolved therein, an ester of sulfuric acid that is represented by the general formula:

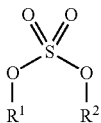

wherein $R^1$ is an aliphatic or aromatic optionally substituted organic radical; and wherein $R^2$ is an aliphatic or aromatic optionally substituted organic radical.

In various embodiments the aqueous catholyte of the instant invention comprises water and, completely or partially dissolved therein, an ester of nitric acid that is represented by the general formula:

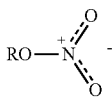

wherein R is an aliphatic or aromatic optionally substituted organic radical.

In various embodiments the aqueous catholyte of the instant invention comprises water and, dissolved therein, a sulfur-containing organic compound such as sulfonic acid or an amide of sulfonic acid (i.e., a sulfonamide). For instance, a sulfonic acid represented by the general formula

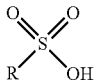

wherein R represents an organic aliphatic or aromatic group. Or sulfonamides represented by the general formula

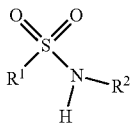

wherein $R^1$, $R^2$=an organic aliphatic or aromatic group.

Suitable sulfonic acids include MES (2-(N-Morpholino)ethanesulfonic acid), MOPS (3-(N-Morpholino)propanesulfonic acid), BES (N,N-Bis(2-hydroxyethyl)-2-aminoethanesulfonic acid), TES (2-[(2-Hydroxy-1,1-bis(hydroxymethyl)ethyl)amino]ethanesulfonic acid), TAPSO (2-Hydroxy-3-[tris(hydroxymethyl)methylamino]-1-propanesulfonic acid), N-[Tris(hydroxymethyl)methyl]-3-amino-2-hydroxypropanesulfonic acid), HEPPS (4-(2-Hydroxyethyl)-1-piperazinepropanesulfonic acid), CHES (2-(Cyclohexylamino)ethanesulfonic acid), 3-Aminobenzenesulfonic acid; for example MES, MOPS, and HEPPS.

Suitable sulfonamides include o-, m-, p-aminobenzenesulfonamides, o-, m-, p-methylbenzenesulfonamides, o-, m-, p-cyanobenzenesulfonamides, 4,4'-diaminobenzenesulphanilide.

In various embodiments the aqueous catholyte of the instant invention comprises water and, dissolved therein, a phenol. Phenols are organic compounds containing an hydroxyl group directly attached to an aromatic carbon atom, and may be represented by the general formula

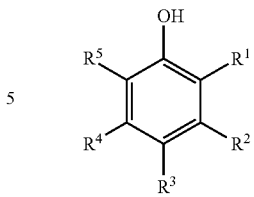

Wherein $R^1$, $R^2$, $R^3$, $R^4$, $R^5$=H, OH, $CH_3$, $C_2H_5$, $C_3H_7$, $NH_2$, $NO_2$, CN, COOH, $SO_3H$, C(R)=O, F, Cl, Br, I, $CF_3$, $NR_3^+$, COOR, $CONH_2$, $CCl_3$, OR, $NR_2$; and R represents H, or an aliphatic or aromatic organic radical.

Phenol acidity and electrooxidation potential both depend on its substituents. The oxidation potential of substituted phenols becomes more positive, and $pK_a$ values become more negative with an increase of Hammett's constant value of the corresponding substituent. In other words, the direct electrochemical oxidation of substituted phenol with an electron-withdrawing group is more difficult, and acidity is higher than that of substituted phenol with an electron-donating group.

Particularly suitable phenols include resorcinol, 2-methylresorcinol, gallic acid, 4-nitrocathecol, 4-hydroxybenzoic acid, 2-nitroresorcinol; for example, α-resorcylic acid, α-resorcylonitrile.

In various embodiments the aqueous catholyte of the instant invention comprises water and, dissolved therein, an aminium salt formed with inorganic acid. For instance, a salt represented by the following general formula $(HNR^1R^2R^3)^+$ $X^-$, wherein $X^-$ represents an inorganic acid residue and $R^1$, $R^2$, $R^3$ may represent hydrogen atom, and at least one of them represents an aliphatic or aromatic optionally substituted organic radical. The aminium salt is preferably selected from chloride, sulfate, perchlorate salts, and even more preferably is a nitrate.

Particularly suitable such salts include aniline nitrate, diethylenetriamine nitrate, ethanolamine nitrate, 2-methyl-1-pyrroline nitrate, methoxyamine nitrate, N-methoxymethylamine nitrate, 1-benzoylpiperazine nitrate, N-methylhydroxylamine nitrate, 2-aminocyanopropane nitrate, N,N-diethylcyanoacetamide nitrate, dimethylaminoacetonitrile nitrate, 2,2-diethylaminopropionitrile nitrate, 2-amino-2-cyanoproapne, piperazine dinitrate, N,N-dimethylethylenediamine dinitrate, N-ethylmorpholine nitrate, and triethanolamine nitrate.

Alternatively, the aminium salt may be based on a N-heterocyclic aromatic compound such as imidazole. Particularly suitable such salts include imidazolium nitrate, 2-methylimidazolium nitrate, 4-hydroxymethyl imidazolium nitrate, 4-hydroxybenzimidazolium nitrate, 4-methoxybenzimidazolium nitrate, 4-(N-methylacetamido)pyridinium nitrate, o-, m-, p-methylpyridinium nitrate, o-, m-, p-ethylpyridinium nitrate, 2-methoxypyridinium nitrate, 3-methoxypyridinium nitrate, 3-hydroxypyridinium nitrate, 4-hydroxypyridinium nitrate, 3-fluoropyridinium nitrate, 3-bromopyridinium nitrate, 3-sulfoxypyridinium nitrate, 3-aminopyridazinium nitrate, 3-carboxypyridinium nitrate, 4-methoxypyridazinium nitrate, and 2-amino-4,6-dimethyl pyrazinium nitrate; for example, imidazolium nitrate.

In yet other alternative embodiments the aminium salt may be an ammonium salt. For instance, that which is represented by the general formula $(NH_4^+)X^-$, wherein $X^-$ is an acid residue.

In various embodiments the aqueous catholyte of the instant invention comprises water and, dissolved therein, one or more inorganic neutral or acid salts.

Particularly suitable neutral salts include nitrate salts derived from a strong acid and a weak base, e.g., zinc nitrate or magnesium nitrate.

In various embodiments the catholyte contains, dissolved therein, two or more of such salts of different composition. For instance a first salt of magnesium nitrate and a second salt of zinc nitrate. Dissolved in the catholyte, the concentration of the respective salts may be adjusted to tune the pH of the catholyte to pH values suitable to decompose lithium carbonate solid product precipitates that may form in alkaline catholytes during exposure to ambient air whence the cell deeply discharged into the basic region. For instance, the inventors have discovered that concentrations greater than or equal to 2 molar (e.g., between 2-3 molar) of a first such said salt (e.g., magnesium nitrate) and 0.1 to 1 molar of a second such said salt of different composition (e.g., zinc nitrate) yields a catholyte formulation capable of providing such benefit. Typically, the magnesium salt (i.e., first salt) is present in concentration to about five times the value of the zinc salt (i.e., second salt). Accordingly, in various embodiments, to enable decomposition of carbonate discharge products on charge, said nitrate salts are dissolved in appropriate proportions to render the starting catholyte pH between 3 and 4, and preferably between 3.1 and 3.8, e.g., about 3.5).

Particularly suitable inorganic acid salts include salts such as lithium dihydrogen phosphate or lithium hydrogen selenate.

In yet other embodiments, the catholyte comprises an amphoteric hydroxide, or combination of two or more different hydroxides, such as zinc hydroxide and aluminum hydroxide sols that provide similar benefit, as described above, or other benefit to the cell chemistry. For instance, from about 0.5 M to 4.0 M to of zinc hydroxide and aluminum hydroxide).

Furthermore, zinc nitrate mentioned above may be used as a precursor of zinc hydroxide. As a result of reaction with the cell discharge product (lithium hydroxide), zinc nitrate converts into zinc hydroxide, which then reacts with lithium hydroxide forming a well soluble product in the form of dilithium tetrahydroxyzincate. Thus, four moles of alkali are consumed per one mole of zinc nitrate in acidic and basic regimes of cell discharge as described below:

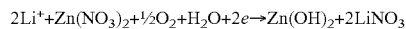
$2Li^+ + Zn(NO_3)_2 + \frac{1}{2}O_2 + H_2O + 2e^- \rightarrow Zn(OH)_2 + 2LiNO_3$

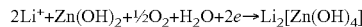
$2Li^+ + Zn(OH)_2 + \frac{1}{2}O_2 + H_2O + 2e^- \rightarrow Li_2[Zn(OH)_4]$ In various embodiments the catholyte comprises a supporting Li salt to maintain conductivity of catholyte at different stages of discharge. It has also been found that introduction of certain concentrations of Li supporting salts, can prevent resistance rise during storage under open circuit conditions. For this purpose, initial (prior to initial discharge) Li cation concentrations of at least 1M, for example 1M and up to 4M, can be effectively used. While the invention is not limited by any particular theory of operation, this effect is attributed to the suppression of ion exchange at the interface between protective membrane and liquid catholyte. Hygroscopic supporting Li salts can be used in order to maintain moisture balance in the cell before the start of discharge. This is one more function of supporting Li salts. Particularly preferred supporting salts include lithium nitrate, e.g., $LiNO_3$. The supporting salts are typically included in the catholyte in addition to any other chemical species or compound, such as, but not limited to, polyprotic organic acids and carboxylic acid derivatives and phosphate esters.

In other aspects, methods are provided. In particular, these include methods of making the aforementioned catholytes and battery cells and a novel method of operating a Li/Air secondary battery cell that enhances electrochemical reversibility when the cell is discharged over both the acidic and basic regimes for added cathode capacity. The method generally includes the steps of:

i) providing an aqueous catholyte having a sufficient acid strength to cause decomposition of lithium carbonate;

ii) discharging the cell from the acidic regime into the basic regime, and optionally to full or nearly full discharge capacity;

iii) subsequently charging the cell into the acidic regime to a capacity that renders the pH of the catholyte sufficient to dissolve and decompose lithium carbonates formed in the cathode compartment; and iv) optionally whence the catholyte has reached or is estimated to have reached the prescribed necessary acidity to decompose carbonate, maintaining the cell at a given voltage or current over a time period sufficient to recover most or all of the initial cell capacity.

DETAILED DESCRIPTION OF SPECIFIC EMBODIMENTS

Introduction

Figure 1A:
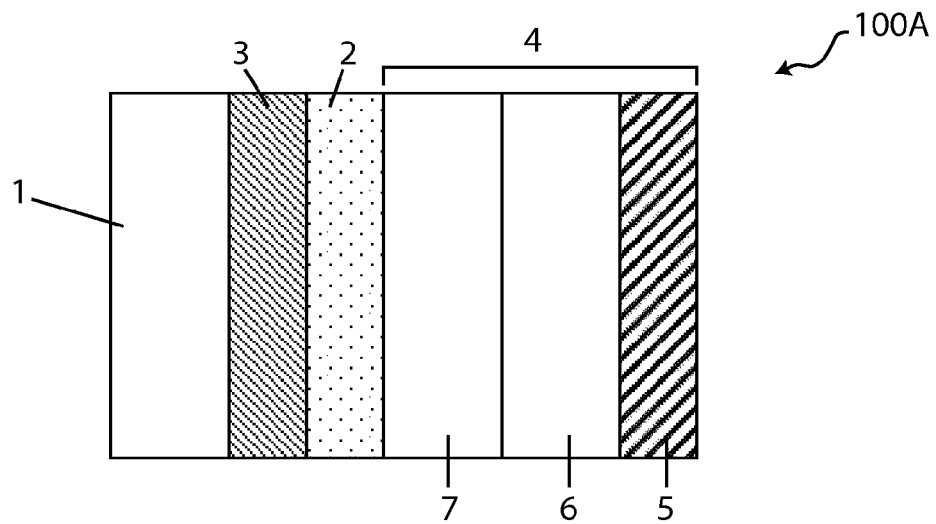
FIG. 1A is a schematic illustration of a Li/air battery cell in accordance with the present invention.

Alkali metal/oxygen electrochemical energy storage cells having aqueous catholytes are described. The instant catholytes comprise water and one or more evaporative-loss resistant and/or polyprotic active compounds completely or partially dissolved in water that partake in the discharge reaction and effectuate cathode capacity in the acidic regime. In various embodiments the active compound is an active proton generator that whence dissolved in water dissociates over the course of cell discharge to yield active protons in the catholyte that partake in the discharge reaction. Typically the active proton generator is a Brønsted-Lowry acid. In various embodiments the active proton generator is an organic acid stable against evaporative losses and therefore particularly suitable for use in a Li/Air battery cell of the instant invention. In various embodiments the active proton generator is a polyprotic organic acid, having two or more (e.g., three) acidic protons, and therefore capable of providing additional cathode capacity in the acidic regime without unduly adding extra weight to the cell. In some embodiments the active compound does not directly provide an active proton. Instead, it undergoes alkaline hydrolysis with alkali formed during cell discharge.

In various aspects the invention provides:

i) alkali metal/oxygen electrochemical energy storage cells comprising the aforementioned inventive aqueous catholytes, and in particular Li/Air secondary batteries wherein the aqueous catholyte is resistant to evaporative losses;

ii) aqueous catholytes for use in alkali metal/oxygen electrochemical energy storage cells, and in particular aqueous Li/Air secondary battery cells; and iii) methods, such as:
   a. methods of making the inventive aqueous catholytes and the instant energy storage cells;
   b. methods of tuning the pH of the catholyte to improve, among other parameters, stability of the ion membrane in contact with the catholyte.
   c. a method of operating a secondary Li/O$_2$ battery cell over a broad range of catholyte pH that includes discharging and charging the cell through both the acidic and basic regimes; and
   d. a method for regenerating the catholyte to promote reversibility and high capacity cycling stability, the method involving charging the cell to an acidic state sufficient to dissolve and decompose lithium carbonate solid products, and thus recover inactivated lithium trapped there within the carbonate salt.

In accordance with the instant invention, the battery cell structure includes: i) a cathode for electro-reducing of molecular oxygen during discharging and electro-oxidizing of water during charging of the cell; ii) an aqueous catholyte having dissolved therein one or more evaporative-loss resistant and/or polyprotic chemically active species or compounds that partake in the discharge/charge reaction; and iii) a protected lithium electrode composed of an electro-active lithium material shielded from contact with the catholyte by a liquid impermeable lithium ion conducting membrane.

Because the catholyte is aqueous it is essential to keep it out of direct contact with the electroactive lithium. Various schemes may be used to provide such protection. Non-limiting examples of protection methods and protected electrode structures that are suitable for use herein and are fully described in U.S. Pat. Nos. 7,282,296; 7,858,223; 7,645,543; 7,390,591; 7,282,295; and 7,824,806, and each of these is hereby fully incorporated by reference for all that they describe. Generally, the protected electrode contains a lithium ion conductive liquid impermeable membrane that is chemically compatible on one side in contact with the catholyte and on the other side in contact with the electroactive lithium. To protect the edges, rigid or compliant seals may be incorporated as are described in U.S. Pat. No. 7,284,806 and U.S. Patent Publication No. 2008/0182157, which are hereby incorporated by reference for all that they describe in this regard.

Two approaches for the development of secondary aqueous lithium air battery chemistry have been described depending on whether the starting catholyte is acidic or neutral:

The first approach makes use of what is generally termed a neutral catholyte solution, typically composed, in its most simplified form, of a supporting lithium salt dissolved in water; the supporting salt serving to support the ionic current through the catholyte during passage of current. The pH of neutral catholyte is about 7, but becomes alkaline almost immediately upon discharge as base (LiOH) is produced according to the following reaction:

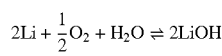

In neutral or alkaline solutions, base formed on discharge causes the cell to immediately enter or remain in the basic regime. Lithium hydroxide solution is known to react with carbon dioxide from ambient environment and form poorly soluble lithium carbonate:

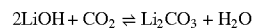

Since lithium carbonate is highly insoluble in neutral, alkaline, and even moderately acidic solutions, active lithium ions can become trapped in highly insoluble solid carbonate products that may form during deep discharge and which may also form during cell resting periods (e.g., at open circuit) in strongly basic catholyte. In both instances the formation of solid carbonate product can render a portion of the initial lithium capacity inactive, leading to capacity fade which can be significant even after just a few cycles (e.g., 1-3 cycles).

If oxygen is used from an external source other than the ambient atmosphere, such as a tank of O$_2$ gas (or air) that is devoid of CO$_2$, carbonate degradation can be avoided. But for a Li/Air cell, which is open to ambient air, CO$_2$ generally enters the catholyte along with the active O$_2$. Accordingly, it is contemplated, herein, that the ingress of CO$_2$ relative to that for O$_2$ may be reduced, and preferably entirely eliminated, by using a highly selective O$_2$ semi-permeable membrane between the cathode and the ambient air, even though, at the present time, such schemes may be impractical or prohibitively expensive. Thus, the reversibility of Li/Air cells discharged into the basic regime, and especially if discharged deeply enough to precipitate a copious amount of LiOH, are challenged by the aforementioned carbonate reaction products and the concomitant loss of active lithium.

To provide a more reversible Li/Air cell, a second approach may be taken which is to use an acidic catholyte and exclusively cycle the cell in the acidic regime to circumvent base and the generally irreversible formation of insoluble solid lithium carbonate salts. Li/Air discharge in acidic catholyte is generally understood by the following cell reaction.

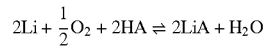

Maintaining operation in the acidic regime avoids accumulation of LiOH and is generally deemed more desirable than the first approach from the perspective of reversibility, cycle life, and service life. However the second approach has a considerably lower theoretical energy density because of the additional weight of the acid. For instance, twice the number of moles of acid is required when discharging in the acidic regime relative to the number of moles of water consumed during discharge in alkaline. From the singular perspective of energy density (or specific gravity), a strong, relatively lightweight inorganic acid is preferred. However, such acids, precisely because of their acid strength, can destabilize the ion conductive membrane yielding very low pH values (e.g., below 3 or 2). Furthermore, low molecular weight acids (strong or otherwise, e.g., weak) though seemingly desirable from the perspective of energy density, are generally volatile and thus susceptible to evaporative losses and therefore may be unsuitable, or at least less desirable, for use in open to air cells such as Li/Air deployed in a wide variety of use applications requiring long service life or deployed under circumstances that may accelerate evaporation of the acid.

Accordingly, the first and second approaches to aqueous Li/Air each have their own particular advantages and disadvantages.

In one aspect, the present invention describes a third approach or method of operating a Li/Air battery cell. The method includes providing a secondary Li/O₂ battery cell, and in particular a Li/Air cell, that can be reversibly cycled over both the acidic and basic regimes, and by this expedient said cells have increased cathode capacity per unit weight, and improved energy density.

In various other aspects the invention provides:
 i) aqueous catholytes for use in alkali metal/oxygen electrochemical energy storage cells, and in particular aqueous Li/Air batteries;
 ii) alkali metal/oxygen electrochemical energy storage cells comprising the said aqueous catholytes;
 iii) methods, such as:
  a. methods of making said aqueous catholytes and said energy storage cells.
  b. methods of tuning the pH of the catholyte to improve stability of the membrane in contact with the catholyte.
  c. methods of operating a secondary Li/O2 battery cell over a broad range of pH regimes, inclusive of both the acidic and basic regimes, and methods thereof for regenerating the catholyte to promote reversibility and high capacity cycling stability.

The active compound may be added to the catholyte to enhance any number of cell performance parameters, including: cathode capacity, reversibility, discharge/charge cycle stability, ion membrane stability, water management and/or to generally improve overall cell performance or a particular performance parameter, including performance during active operation (i.e., during actual discharge and charge) and/or upon open circuit during storage prior to operation or as a result of intermittent rest periods over the course of operation. In various embodiments the active compound in the catholyte may serve one or more functions, including:

furnishing active protons into the catholyte via dissolution of an active compound that, whence dissolved or otherwise, is resistant to evaporative losses and stable in contact with the ion conductive membrane;

simultaneously tuning the pH of the catholyte to enhance stability with the ion conductive membrane while providing active protons for discharge in the acidic regime (i.e., that portion of the discharge/charge capacity over which the catholyte has a pH less than 7);

buffering the catholyte pH over a predetermined discharge capacity as a mechanism to defer or lessen cell operation in the basic regime (i.e., that portion of the discharge/charge capacity over which the catholyte has a pH greater than 7);

enabling regeneration of inactivated lithium ions in a solid phase of carbonate discharge product, and thus improving reversibility of high capacity Li/Air secondary cells that are operated in both the acidic and basic regimes;

simultaneously enhancing chemical stability of the membrane and water management of cells which are operated open to air (e.g., various embodiments of the instant Li/Air cell).

Reference will now be made in detail to specific embodiments of the invention. Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention. In the following description, numerous specific details are set forth in order to provide a thorough understanding of the present invention. The present invention may be practiced without some or all of these specific details. In other instances, well known process operations have not been described in details so as to not unnecessarily obscure the present invention.

When used in combination with "comprising,": "a method comprising," "a device comprising" or similar language in this specification and the appended claims, the singular forms "a," "an,": and "the" include plural reference unless the context clearly dictates otherwise. Unless defined otherwise, all technical and scientific terms used herein have the same meaning as commonly understood to one of ordinary skill in the art to which this invention belongs.

In the figures, like reference numbers indicate identical or functionally similar elements.

Cell Structure

A battery cell in accordance with the current invention is schematically shown in FIG. 1A. The cell comprises a Li anode 1 protected with a protective membrane architecture chemically stable to both the anode and the environment of an adjacent cathode compartment 4. The protective membrane architecture typically comprises a solid electrolyte protective membrane 2 and an interlayer 3. The protective membrane architecture is in ionic continuity with the Li anode 1 and is configured to selectively transport Li ions into and out of the cathode compartment 4 while providing a substantially impervious barrier to the environment external to the anode. The cathode compartment 4 comprises an air cathode 5 (also sometimes referred to herein as an "oxygen electrode") and an aqueous catholyte 6, which is disposed between the cathode 5 and the solid electrolyte protective membrane 2 and is in direct contact with the cathode 5 for reducing molecular oxygen, and is also typically in contact with a surface of the solid electrolyte membrane 2. The cathode compartment 4 can further comprise one or more porous solid reservoir structures 7 disposed between the solid electrolyte protective membrane 2 and the air cathode 5. The aqueous catholyte 6 and porous solid reservoir 7 are represented as separate layers in FIG. 1A for ease of illustration, however they may be and often are co-extensive in many embodiments of the invention. The aqueous catholyte, in contact with the cathode, does not contact the Li anode.

Aqueous Catholytes

In various embodiments, the aqueous catholyte 6 is an aqueous solution of water and at least one evaporative-loss resistant and/or polyprotic active compound that, dissolved in water, partakes in the discharge reaction at the cathode in the acidic region. Typically a lithium salt is also dissolved in the catholyte to support the ionic current and in some embodiments may provide the additional benefit of water management to prevent dry out of a Li/Air cell. The active compound may be one or more of the following compounds:
 i) mono- and polyprotic organic acids and their acid salts, such as carboxylic acids represented by the general formula:

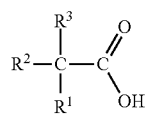

wherein R¹ represents an organic radical, R² represents H or an organic radical; and R³ represents H or an organic radical. The organic radical may contain other carboxylic groups; then, the acid is polyprotic. Examples include malonic acid, glutaric acid and methylsuccinic acid.

ii) functionally substituted carboxylic acids, such as amino acids and hydroxy acids. As used herein a "substituted" group is derived from the unsubstituted parent structure in which there has been an exchange of one or more hydrogen atoms for another atom or group.

iii) carboxylic acid derivatives including acyl halides, anhydrides, esters, amides, nitriles.

iv) lactones;

v) esters of inorganic acids;

vi) sulfur containing organic acids such as sulfonic acids or their derivatives such as sulfonamides;

vii) phenols (optionally substituted and functionalized);

viii) inorganic neutral and acid salts, including mixtures of said salts;

viii-a) inorganic neutral salts derived from a strong acid and a weak base, e.g. zinc nitrate or magnesium nitrate;

viii-b) inorganic acid salts, e.g. lithium dihydrogen phosphate and lithium hydrogen selenate;

ix) amphoteric hydroxides;

x) onium salts formed with organic acids xi) onium salts formed with inorganic acids;

Onium salts are of the general formula: $(R_nMH)^+X^-$ wherein R may represent hydrogen, and at least one of the R represents an aliphatic or aromatic optionally substituted organic radical; M represents elements of the nitrogen group, or chalcogen, or halogen; $X^-$ is organic or inorganic acid residue. When M is nitrogen, an onium salt is an aminium salt. An aminium salt where the aminium cation is a primary, secondary, or tertiary ammonium cation is of the general formula $(NHR^1R^2R^3)^+$ wherein $R^1$, $R^2$, $R^3$ may represent hydrogen, and at least one of them represents an aliphatic or aromatic optionally substituted organic radical.

xii) supporting salts of the alkali metal (e.g., supporting lithium salts).

In various embodiments, the catholyte includes an active compound that whence dissolved in water dissociates over the course of discharge to yield one or more active protons in the catholyte. Typically the active compound is an organic Brønsted-Lowry acid. When incorporated in an open to air cell the compound should be sufficiently resistant to evaporative losses, and preferably the relative volatility of the acid in the catholyte is lower than that of water. That the active compound should be highly resistant to evaporative losses is very important for an open to air cell because while water can ingress into the catholyte from the ambient air over the course of cell operation, the same is not true for the acid or more generally the active compound, regardless of whether it (the active compound) is dissolved in the catholyte or otherwise present in the cathode compartment in contact with the catholyte (e.g., as a solid phase active compound that is in dynamic equilibrium with its saturated solution in catholyte). By sufficiently resistant to evaporative losses it is meant that the compound, dissolved in water of the catholyte or otherwise, has a sufficiently low vapor pressure that over the service life of the open to air cell in which it is incorporated the total amount of active compound lost to vaporization is less than 10%, preferably less than 5% and even more preferably less than 2%. Various metrics other than vapor pressure may be used to gauge the relative evaporative resistance of structurally or chemically similar active compounds, these include the compound's boiling point temperature and in some instances, where the compounds are structurally similar, molecular weight may provide a metric for volatility to some extent.

By use of the term active proton when referring to an active compound it is meant that the compound has at least one acidic proton that partakes in the discharge reaction subsequent to the dissociation of the dissolved active compound. For instance, according to the following cell reaction where n represents the basicity of an acid.

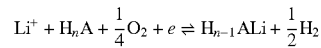

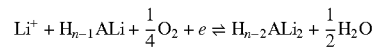

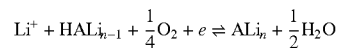

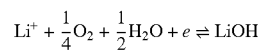

where $H_nA$ is a mono- or polyprotic acid, n=1-5. Preferably, the formed lithium salt is soluble in water, and even more preferably the solubility of the salt ($ALi_n$ or $Li_nA$) in water is greater than 1 molar.

In various embodiments an acid residue A may be:

carboxylic anion $RCOO^-$ wherein R represent an aliphatic or aromatic optionally substituted organic radical;

N-containing aliphatic or aromatic compound $R^1R^2R^3N$ where nitrogen atom has lone pair of electrons and wherein $R^1$, $R^2$, $R^3$ may represent hydrogen, and at least one of them represent an aliphatic or aromatic optionally substituted organic radical;

arenoxy anion $Ar-O^-$;

sulfonamide anion;

sulfoxide anion

The active compound provides active proton capacity to the cathode via the catholyte, and full or partial benefit of the inventive catholyte may be derived regardless of whether the cell is a primary or a secondary or exclusively or otherwise operated in the acidic regime, basic regime or both, or some combination thereof. In other words, there is no limitation regarding the manner in which the battery cell may be operated in order to derive full or partial benefit from the active compound.

In various embodiments the active compound is a carboxylic acid having the general formula:

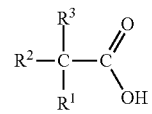

wherein $R^1$ represents an organic radical, $R^2$ represents H or an organic radical; and $R^3$ represents H or an organic radical.

The carboxylic acid represented by formula (I) may be aliphatic or aromatic, monocarboxylic or polycarboxylic. A single composition of acid may be dissolved in the catholyte; however, combinations of different carboxylic acid compositions are contemplated as well.

With continued reference to formula (I), in various embodiments at least one of $R^1$, $R^2$, and $R^3$ represent an organic radical, and in certain embodiments thereof each of $R^1$, $R^2$, and $R^3$ represent an organic radical. In various preferred embodiments at least one of $R^1$, $R^2$ or $R^3$ contains a carboxyl group.

For instance, in some embodiments at least one of $R^1$, $R^2$ and $R^3$ represent an organic radical selected from the group consisting of an optionally substituted $C_1$-$C_{10}$ alkyl group, optionally substituted $C_2$-$C_{10}$ alkenyl group, optionally substituted $C_2$-$C_{10}$ alkynyl group. As used herein a "substituted group" is derived from the unsubstituted parent structure in which there has been an exchange of one or more hydrogen atoms for another atom or group. In other embodiments at least one of $R^1$, $R^2$ and $R^3$ represent an organic radical selected from the group consisting of an optionally substituted $C_4$-$C_{10}$ cycloalkyl, optionally substituted $C_4$-$C_{10}$ cycloalkenyl, and optionally substituted 3-10 membered heterocyclyl. In yet other embodiments at least one of $R^1$, $R^2$ and $R^3$ represent an organic radical selected from the group consisting of an optionally substituted carbo- and heterocyclic 5-10 membered aryl.

In various embodiments the carboxylic acid is malonic acid, glutaric acid, methylsuccinic acid, or some combination thereof (e.g., malonic acid wherein, with reference to formula (I), $R^2$ and $R^3$ represent H; and $R^1$ represents carboxyl group).

For a Li/Air cell, volatility of the active compound must be considered. Other than vapor pressure, boiling-point temperature and molecular weight have been found to provide a practical and useful metric for making a first order approximation on the evaporative resistance of the active compound whence dissolved. For instance, given similar structures, compounds with higher molecular weights will have lower volatility, and compounds with higher boiling points are generally less volatile. Of course low molecular weight acids are highly desirable from the perspective of energy density, but this singular approach to a suitable acid is ineffective for aqueous lithium air because it does not consider evaporative losses over time.

To achieve an optimal, or near optimal, balance between the weight of the active compound and evaporative loss, polyprotic organic acids are proposed herein as the proton generating species. Because of their relatively moderate pKa values, these acids do not render the catholyte pH so acidic as to destabilize the ion membrane or other cathode compartment components such as but not limited to oxygen electro-catalysts. Because organic polyprotic acids have at least two acidic protons they can have a relatively high active proton capacity per unit of weight, and are generally robust enough in molecular weight to be sufficiently non-volatile for most or all applications, including for use in open to air cells. Preferably the boiling point of the cathode active materials is greater than 125° C., and even more preferably the vapor pressure of the cathode active materials at standard temperature and pressure is less than approximately 4-5 mmHg. In various embodiments the active proton generator is an organic acid substantially stable against evaporative losses, for example having a vapor pressure lower than that of acetic acid (11.4 mmHg (20° C.)), in particular much lower, such as less than 1 mmHg or less than $10^{-3}$ mmHg, for example malonic acid ($3.2 \times 10^{-5}$ mmHg (25° C.)) or citric Acid ($1.66 \times 10^{-8}$ mmHg (25° C.)) For example, one particularly suitable organic polyprotic acid is malonic acid.

The electrochemical reaction in a Li/Air cell incorporating a catholyte comprising malonic acid is a two-step process, one for each of the first and second acidic protons, as illustrated below.

Anode:

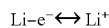

Cathode:

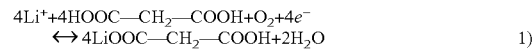

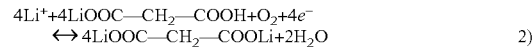

In addition to malonic acid, other particularly suitable polyprotic acids are glutaric acid, methylsuccinic acid, and citric acid.

Accordingly, in various embodiments of the instant invention the aqueous catholyte is acidic and comprises an active organic polyprotic acid comprising organic radical at least two acidic proton (e.g., three). The utility of employing such an acid is at least two fold.

Firstly, polyprotic acids have the capacity to furnish more than one hydrogen ion per acid molecule, thus polyprotic acids can effectuate greater discharge capacity per unit weight in the acidic regime than that of a monoprotic acid of equal molecular weight. And from the perspective of volatility, polyprotic acids provide resistance to evaporative losses due to their molecular weight and relatively greater number of hydrogen bonds, but do not over burden the weight of the cell because they donate two or more active protons per acid molecule. Accordingly, polyprotic acids provide significant advantage when used in the instant catholytes because the molecules are large enough to resist evaporative losses and do not significantly burden cell weight because of their large active proton to weight ratio. In various embodiments the active proton to molecular weight ratio of the polyprotic organic active compounds are preferably in the range of: 50-70 g/equivalent of $H^+$; 71-90 g/equivalent of $H^+$; 91-110 g/equivalent of $H^+$.

Secondly, the acid strength of polyprotic acids, because they comprise two or more acidic protons each characterized with corresponding pKa value, may be tuned via partial neutralization to yield a catholyte of desired pH or one within a desired pH range. In some embodiments partial neutralization of the organic polyprotic acid yields an acid salt (e.g., a lithium acid salt) wherein one or more, but not all, of the acidic protons of the acid is neutralized by strong base to form water, and as such the neutralized hydrogens are de-activated (i.e., no longer available as an active proton to participate in the cell reaction). In other embodiments polyprotic acid yields an aminium neutral or acid salt where the number of acidic protons doesn't change as compared to the initial acid. However, the formed aminium salt of a polyprotic organic acid has different pKa values, for instance raised, thus reducing the acid strength of the initial polyprotic organic acid.

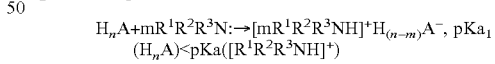

where $H_nA$ is polyprotic acid, n is number of acidic protons, $R^1R^2R^3N$: is an amine having a lone electron pair on nitrogen atom, $R^1$, $R^2$, $R^3$ may represent hydrogen, and at least one of them represents an aliphatic or aromatic optionally substituted organic radical. If m=n, the aminium salt is a neutral aminium salt.

Accordingly, in various embodiments the catholyte comprises, prior to initial discharge (or initial active operation) a neutral aminium salt in which all the acidic protons were transferred to amine molecules or to acid aminium salt containing one or more acidic protons in acid residue.

The acid may be partially neutralized by adding a certain amount of a base to the dissolved polyprotic acid. By use of the term partial neutralization it is meant that the neutralization is not complete, which is to mean that one but not all of the acidic protons are neutralized in the process. For instance, for a triprotic acid the first and/or second acidic hydrogen may be neutralized but not the third. In various embodiments the neutralizing agent is a strong base, such as a hydroxide, and preferably a hydroxide of the alkali metal. For instance, for a Li/Air cell the neutralizing agent may be LiOH.

In various embodiments once partially neutralized the polyprotic acid is converted to an acid salt. For instance, partial neutralization of malonic acid by LiOH yields the acid salt lithium hydrogen malonate, or for citric acid, the acid salt is lithium dihydrogen citrate or dilithium hydrogen citrate. In various embodiments the catholyte may include both the organic polyprotic acid and its partially neutralized counterpart in various ratios, for example, the catholyte comprising both malonic acid and lithium hydrogen malonate. Preferably the lithium acid salt is soluble in water and more preferably has solubility greater than 1 molar.

In various embodiments decreasing acid strength may be realized by adding a weak Lewis base having an atom with a lone electron pair that reacts with the polyprotic acid to form an onium salt, and more particular aminium salt wherein one or more of the acidic protons originally attached to the polyprotic acid are transferred to one or more weak Lewis base molecules. By this expedient, the pKa values of the aminium salt are higher, and there is no loss of active proton capacity since the acidic proton is merely transferred as opposed to being neutralized. Preferably, the aminium salt is soluble in water and more preferably has solubility greater than 1 molar. One particularly suitable proton acceptor (i.e., weak Lewis base) is imidazole, and the resulting aminium salt isimidazolium malonate, or imidazolium hydrogen malonate, or imidazolium citrate, or imidazolium hydrogen citrate, or imidazolium dihydrogen citrate.

In various embodiments the aforementioned polyprotic acids and aminium salts may be functionalized or substituted to enhance one or more of the following characteristics: stability to oxidation, acid strength, resistance to evaporative losses, hygoscopicity of the acid or an acid salt that forms as a result of cell discharge, as well as improved oxidative stability of the acid residue.

For instance, in various embodiments the aqueous acidic catholyte of the instant invention comprises water and, dissolved therein, a "functionally substituted" carboxylic acid for instance an amino acid or hydroxy acid.

In various embodiments the functionally substituted carboxylic acid is an amino acid, such as that containing an amine group, a carboxylic group, and an aliphatic or aromatic organic radical. In embodiments the amino acid has the following general formula

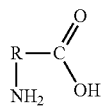

wherein R represents an aliphatic or aromatic optionally substituted organic divalent radical.

Amino acids and the like are advantageous because they may be used in the form of an aminium salt where besides protonated amino group or groups, it also has the acidic proton on carboxylic group. In the case of such aminium salt, the molecular mass/active proton ratio can increase. For instance, as illustrated below, an amino acid aminium salt consumes two moles of alkali per one mole of amino acid aminium salt,

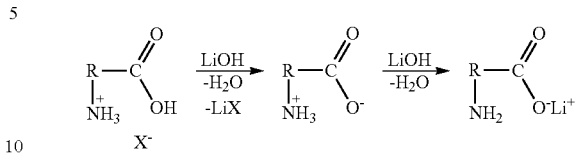

wherein X may be $NO_3^-$, $SO_4^{2-}$, $ClO_4^-$

Suitable amino acids include Glycine, alanine, valine, proline, hydroxyproline, histidine, cysteine, serine, glutamine, lysine, hydroxylysine, arginine, methionine, asparagine, phenylalanine, and aminomalonic acid. For example glycine, alanine, and proline.

In various embodiments the functionally substituted carboxylic acid is an hydroxy acid such as that containing an hydroxy group, a carboxylic group, and an aliphatic or aromatic organic radical. In embodiments the hydroxy acid has the following general formula

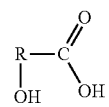

wherein R represents an aliphatic or aromatic organic divalent radical.

Suitable hydroxy carboxylic acids include citric acid, glycolic acid, lactic acid, 2-hydroxypropionic acid, 3-hydroxypropionic acid, 2-hydroxybutyric acid, 3-hydroxybutyric acid, and the like (e.g., citric acid).

For example, citric acid may be the active compound, and the subsequent electrochemical reaction of the cell may be represented by the following equations Anode:

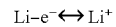

Cathode:

  (1)

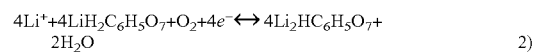  (2)

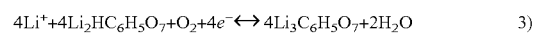  (3)

Another particularly suitable class of molecule for use as an active compound in the instant aqueous catholyte is phenols. Phenols are organic compounds containing a hydroxyl group directly attached to an aromatic carbon atom, and may be represented by the general formula

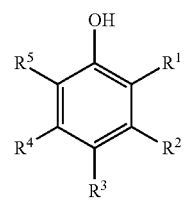

Wherein $R^1$, $R^2$, $R^3$, $R^4$, $R^5$=H, OH, $CH_3$, $C_2H_5$, $C_3H_7$, $NH_2$, $NO_2$, CN, COOH, $SO_3H$, C(R)=O, F, Cl, Br, I, $CF_3$, $NR_3^+$, COOR, $CONH_2$, $CCl_3$, OR, $NR_2$; and R represents H, or an aliphatic or aromatic organic radical.

Phenol acidity and electrooxidation potential both depend on its substituents. The oxidation potential of substituted phenols becomes more positive, and $pK_a$ values become smaller, with an increase of Hammett's constant value. In other words, the direct electrochemical oxidation of substituted phenol with an electron-withdrawing group is more difficult, and acidity is higher than that of substituted phenol having an electron-donating group.

Particularly suitable phenols include resorcinol, 2-methylresorcinol, gallic acid, 4-nitrocathecol, 4-hydroxybenzoic acid, 2-nitroresorcinol; for example, α-resorcylic acid, α-resorcylonitrile.

In yet other embodiments the cathode active materials may be sulfur-containing

In various embodiments the aqueous catholyte of the instant invention comprises water and, dissolved therein, a sulfur-containing organic compound such as sulfonic acid or an amide of sulfonic acid (i.e., a sulfonamide). For instance, a sulfonic acid represented by the general formula

wherein R represents an organic aliphatic or aromatic group. Or sulfonamides represented by the general formula

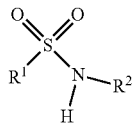

wherein $R^1$, $R^2$=organic aliphatic or aromatic group.

Suitable suflonic acids include MES (2-(N-Morpholino) ethanesulfonic acid), MOPS (3-(N-Morpholino)propanesulfonic acid), BES (N,N-Bis(2-hydroxyethyl)-2-aminoethanesulfonic acid), TES (2-[(2-Hydroxy-1,1-bis(hydroxymethyl) ethyl)amino]ethanesulfonic acid), TAPSO (2-Hydroxy-3-[tris(hydroxymethyl)methylamino]-1-propanesulfonic acid, N-[Tris(hydroxymethyl)methyl]-3-amino-2-hydroxypropanesulfonic acid), HEPPS (4-(2-Hydroxyethyl)-1-piperazinepropanesulfonic acid), CHES (2-(Cyclohexylamino) ethanesulfonic acid), 3-Aminobenzenesulfonic acid; for example MES, MOPS, and HEPPS.

Suitable sulfonamides include o-, m-, p-aminobenzenesulfonamides, o-, m-, p-methylbenzenesulfonamides, o-, m-, p-cyanobenzenesulfonamides, 4,4'-diaminobenzenesulphanilide.

Still in other embodiments the cathode active material is a nitrogen-containing salt.

Accordingly, in various embodiments the aqueous catholyte of the instant invention comprises water and, dissolved therein, an aminium salt formed with inorganic acid. For instance, a salt represented by the following general formula $(HNR^1R^2R^3)^+X^-$, wherein $X^-$ represents an inorganic acid residue, and $R^1$, $R^2$, $R^3$ may represent hydrogen, and at least one of them represents an aliphatic or aromatic optionally substituted organic radical. The aminium salt is preferably a nitrate.

Particularly suitable such salts include aniline nitrate, diethylenetriamine nitrate, ethanolamine nitrate, 2-methyl-1-pyrroline nitrate, methoxyamine nitrate, N-methoxymethylamine nitrate, 1-benzoylpiperazine nitrate, N-methylhydroxylamine nitrate, 2-aminocyanopropane nitrate, N,N-diethylcyanoacetamide nitrate, 2,2-diethylaminopropionitrile nitrate, 2-amino-2-cyanoproapne, dimethylamniacetonitrile nitrate, piperazine dinitrate, N,N-dimethylethylenediamine dinitrate, N-ethylmorpholine nitrate, and triethanolamine nitrate.

Alternatively, the aminium cation of the salt may be based on a N-heterocyclic aliphatic or aromaticompound, such as imidazole. Particularly suitable such salts include imidazolium nitrate, 2-methylimidazolium nitrate, 4-hydroxymethyl imidazolium nitrate, 4-hydroxybenzimidazolium nitrate, 4-methoxybenzimidazolium nitrate, 4-(N-methylacetamido) pyridinium nitrate, o-, m-, p-methylpyridinium nitrate, o-, m-, p-ethylpyridinium nitrate, 2-methoxypyridinium nitrate, 3-methoxypyridinium nitrate, 3-hydroxypyridinium nitrate, 4-hydroxypyridinium nitrate, 3-fluoropyridinium nitrate, 3-bromopyridinium nitrate, 3-sulfoxypyridinium nitrate, 3-aminopyridazinium nitrate, 3-carboxypyridinium nitrate, 4-methoxypyridazinium nitrate, and 2-amino-4,6-dimethyl pyrazinium nitrate; for example, imidazolium nitrate.

In accordance with the various preceding embodiments, substitution and/or functionalization of the parent structure of the active compound, such as that represented in formula (I) and the like, can be used to tune the acid strength of the compound.

In another aspect of the invention, the catholyte 6 comprises an active agent that, rather than donating an acidic proton into the catholyte via acid dissociation, effectively buffers the catholyte via reaction of alkaline hydrolysis with the cell discharge product (lithium hydroxide). Preferably the alkaline hydrolysis reaction is reversible, thus providing benefit to either primary or secondary Li/Air batteries.

Particularly suitable agents are carboxylic acid derivatives including acyl halides, anhydrides, esters, amides and nitriles; especially esters, including diethylene glycol dibenzoate, 2-methoxyethyl cyanoacetate, ethylene glycol monosalicylate, and ethylene brassylate. For instance, in embodiments wherein the agent is a carboxylic acid derivative, the cell reaction may be generalized as follows.

$$Li^+ + R(COX)_n + \tfrac{1}{4}O_2 + \tfrac{1}{2}H_2O + e \rightarrow RCOOLi(COX)_{n-1} + XH$$

$$Li^+ + RCOOLi(COX)_{n-1} + \tfrac{1}{4}O_2 + \tfrac{1}{2}H_2O + e \rightarrow R(COOLi)_2(COX)_{n-2} + XH$$

. . .

$$Li^+ + R(COOLi)_{n-1}COX + \tfrac{1}{4}O_2 + \tfrac{1}{2}H_2O + e \rightarrow R(COOLi)_n + XH$$

$$Li^+ + \tfrac{1}{4}O_2 + \tfrac{1}{2}H_2O + e \rightarrow LiOH$$

where R is multivalent organic radical with 1 to 10 carbon atoms;

n=1-5

In various use applications stability of the ion conductive membrane in contact with the catholyte is essential, and the extent of that stability can be determinative of battery service life. Without intending to be limited by theory or any particular mechanism of membrane degradation, in aqueous solution ion exchange at the surface can lead to impedance rise that may ultimately cause pre-mature polarization of the cell and early failure. In one aspect the present invention provides aqueous catholytes that enhance the stability of the membrane by incorporating in the catholyte an amount of lithium salt sufficient to suppress ion exchange, and, in addition, said salts are preferably hygroscopic and assist in water management to prevent cell dry out due to evaporative water loss which can occur over time in an open to air cell.

In an open to air cell (e.g., Li/Air cell) the anion composition of the supporting salt must be considered as it pertains to electrochemical stability on charge, and in particular stability against anodic oxidation in order to avoid undesirable reactions, such as the formation of a volatile toxic compound. For that reason alone chloride salts, while suitable for use in a primary lithium air battery cell, and generally considered to be highly innocuous and safe since they are typically known in the chemical fields as spectator ions, are in various embodiments entirely unsuitable herein as a salt in a secondary aqueous lithium air battery if upon charge chloride gas forms prior to the oxygen evolution reaction (i.e., OER). Accordingly, in various embodiments of the instant invention the catholyte is devoid of any chloride containing salts, and even more preferably devoid of free chloride ions in the catholyte. Preferably the anion of the supporting salt is $NO_3$, $—SO_4^{2-}$, or $ClO_4^-$, for example nitrate.

In various embodiments the supporting salt concentration in the catholyte is about 1 molar or about 2 molar and typically greater than 1 molar. Preferably the salt is lithium nitrate.

In the various preceding embodiments the supporting lithium salts and lithium salts that are produced as a result of cell discharge are preferably soluble in water, hygroscopic and have water solubility greater than 1 molar (i.e., are soluble in water to concentrations greater than 1 molar).

To increase service life of a Li/Air battery cell the acid generating active compound, regardless of the manner in which the cell is operated, is most preferably non-volatile. By use of the term substantially non-volatile it is meant that the acid has a sufficiently low vapor pressure and that the molecules of the compound, whence dissolved in the catholyte, are not evaporated out of the cell to an extent that would cause the cell to lose more than 10% of the active compound over the operating service life of the cell, wherein the operating service life begins when the catholyte is exposed to ambient air, such as upon activation (e.g., by peeling a release layer off of the gas entry holes). More preferably the evaporative loss is less than 5%, and even more preferably less than 2% over the operating service life. In preferred embodiments the vapor pressure of the acid generating species and its lithium salt is less than 11 mmHg at standard temperature and pressure, in particular embodiments orders of magnitude less, and/or the boiling point temperature is greater than 125° C.

In the various preceding embodiments the anodic oxidative stability of the active compound or agent may be enhanced to achieve more effective cycling, and in particular this may be accomplished through substitution or addition of organic radicals, functional groups or other groups that are electron withdrawing or otherwise increase the anodic oxidation potential of the active compound, or in the case of an acid, its conjugate base. Preferably, the potential of electro-oxidation is greater than the oxygen evolution potential for the initial composition of the aqueous catholyte, and its products of discharge.

For example, the addition of an electron withdrawing group to the acid molecule through substitution or otherwise can provide benefit as it pertains to the electro-oxidative stability of the acid, and in particular its conjugate base. Electro-oxidative stability is of course important for a rechargeable $Li/O_2$ battery cell, and electron withdrawing groups such as halogens, halogenated organic groups, cyano, nitro, sulfo, and carboxyl groups may be attached to the acid to increase its anodic oxidation potential above that for the oxygen evolution reaction (OER), or to further stabilize the acid for those instances wherein the potential of the OER increases over the course of cell cycling; for example, via the loss of catalytic activity in the cathode.

In another aspect of the instant invention a Li/Air battery cell (or more generally a $Li/O_2$ battery cell) is provided that may be discharged deeply into the basic regime with improved reversibility on charge by using a third approach (or method) that encompasses discharging the cell into the basic regime and charging the cell into the acidic regime, and in particular charging the cell beyond a capacity sufficient to render the pH of the catholyte sufficient to cause decomposition of lithium carbonate.

Said third approach involves starting with an acidic catholyte containing an acid generating chemical species (or active compound) that has the following requisite properties of substantial non-volatility, chemically compatibility in contact with the membrane, and stability to electro-oxidation, which is to mean that during the charging cycle (whence molecular oxygen is formed and evolved from the cell catholyte) the conjugate base of the acid is not electro-oxidized. Moreover, the pH of the initial catholyte (i.e., the catholyte composition prior to the initial discharge) should be sufficiently acidic to effectuate decomposition of lithium carbonate during the charging cycle.

The instant method takes advantage of the fact that solid carbonates are soluble and undergo acid base decomposition involving $CO_2$ (g) evolution when placed in an acidic medium of sufficient acid strength. For instance, in accordance with the following sequence of reactions:

$$Li_2CO_3 + HA \rightarrow LiHCO_3 + LiA \qquad (1)$$

$$LiHCO_3 + HA \rightarrow H_2CO_3 + LiA \qquad (2)$$

$$H_2CO_3 \rightleftharpoons H_2O + CO_2 \qquad (3)$$

In various embodiments the method involves: i) starting with an acidic catholyte of sufficient acid strength to dissolve and react the carbonate salt as described above; ii) discharging the cell from this acidic state into the basic regime wherein LiOH may precipitate, and the catholyte, now alkaline and exposed to ambient air, is susceptible to carbonation and the formation of solid carbonate; and iii) charging the cell into the acidic regime, and to a sufficient capacity to render the pH of the catholyte acidic enough (i.e., of a low enough pH) to drive dissolution and decomposition of the lithium carbonate salt.

Provided that the catholyte is properly formulated as generally taught above and further described below using a more detailed embodiment, said third approach provides many advantages compared to cycling exclusively in the acidic regime (as is prescribed by the second approach), or that of solely cycling in the basic regime or between neutral and basic regimes (which is the case for said first approach).

Foremost among the advantages of the third approach is the simultaneous improvement in specific gravity and reversibility, which leads to higher energy density and longer cycle life. The theoretical energy density of cells cycled in both the acidic and basic regime can be twice that of cells cycled exclusively in the acidic regime, and far more reversible when compared to cycling cells within the neutral/basic regime. The energy density boost is derived from two factors. Firstly, capacity in the acidic regime is derived from the acidic protons of the active compound, and, secondly, water necessary to operate the cell in the basic regime is furnished as a product of discharge in the acidic regime.

$$2Li + \frac{1}{2}O_2 + 2HA \rightleftharpoons 2LiA + H_2O \text{[acidic regime]}$$

$$2Li + \frac{1}{2}O_2 + H_2O \rightleftharpoons 2LiOH \text{[basic regime]}$$

The improved reversibility stems from charging the cell into the acidic regime to a sufficiently low pH that solid lithium carbonate is dissolved and decomposed, and as a result the lithium capacity that would have otherwise been lost as an element trapped in the carbonate, is reversibly recovered on charge. By this expedient, reversible secondary Li/Air cells are provided having a theoretical energy density that is significantly larger than that of the same cell cycled solely in the acidic regime, but with greatly improved reversibility when compared to a cell that is operated exclusively in the basic regime.

Various charging protocols are contemplated herein to enhance the rate at which and the extent to which the catholyte may be regenerated during the charging cycle. These include holding the cell at constant voltage or at relatively low constant current whence the catholyte pH is sufficiently acidic to stimulate acid decomposition of carbonate solid products, as described above. By use of the term regenerated when referring to the catholyte it is meant that lost lithium capacity can be recovered on charge. To effect regeneration the acid strength of the initial catholyte (also sometimes referred to herein as the starting catholyte) should be sufficient to decompose the carbonate but not so acidic as to degrade the membrane. For this purpose suitable pH values are typically in the range of about 2.5 to 4.5, preferably 3 to 4 and more preferably 3.1 to 3.8, e.g., 3.5.

In an open to air cell, acid strength alone (i.e., pH of the catholyte) is not enough to stabilize prolonged cycling if the acid used to effect the pH is itself volatile in air. Accordingly, for a Li/Air cell, the proton generating species that acidifies the catholyte is preferably resistant to evaporative losses, and, moreover, the pH of the catholyte is preferably tuned by the composition of the active compound so as to not degrade the solid electrolyte membrane, especially during initial storage of the cell, wherein prolonged contact with the catholyte is contemplated.

In various embodiments, the active compounds are entirely non-volatile. For instance, in various embodiments the active compound comprises metal aqua ions that interact with the product of cell discharge (hydroxide ions); for example, zinc and magnesium ions. The metal ions may be incorporated in the cell by dissolution of an inorganic neutral salt derived from a strong acid and a weak base. The cell reaction may be generalized by the following set of equations.

$$X\, Li^+ + M_xA_y + \tfrac{1}{4} \cdot X\, O_2 + \tfrac{1}{2} \cdot X\, H_2O + xe \rightarrow [MOH]_xA_{y-1} + Li_xA$$

$$X\, Li^+ + [MOH]_xA_{y-1} + \tfrac{1}{4} \cdot X\, O_2 + \tfrac{1}{2} \cdot X\, H_2O + xe \rightarrow [M(OH)_2]_xA_{y-2} + Li_xA$$

. . .

$$X\, Li^+ + [M(OH)_{y-1}]_xA + \tfrac{1}{4} \cdot X\, O_2 + \tfrac{1}{2} \cdot X\, H_2O + xe \rightarrow M(OH)_y + Li_xA$$

$$Li^+ + \tfrac{1}{4}O_2 + \tfrac{1}{2}H_2O + e \rightarrow LiOH$$

where M=metal; A=acid residue; x=basicity of an acid; y=metal oxidation number

In particular magnesium nitrate:

$$Li^+ + Mg(NO_3)_2 + \tfrac{1}{4}O_2 + \tfrac{1}{2}H_2O + e \rightarrow Mg(OH)NO_3 + LiNO_3$$

$$Li^+ + Mg(OH)NO_3 + \tfrac{1}{4}O_2 + \tfrac{1}{2}H_2O + e \rightarrow Mg(OH)_2 + LiNO_3$$

$$Li^+ + \tfrac{1}{4}O_2 + \tfrac{1}{2}H_2O + e \rightarrow LiOH$$

Through judicious selection, the salt may also serve a secondary purpose, albeit no less important for an open to air cell, which is to facilitate water management and in particular to maintain a sufficient water content in the catholyte to prevent dry out. Accordingly, it is preferable to use an active salt that is also hygroscopic. For instance, particularly preferred anions (or acid residue as it sometimes referred to) include nitrate, sulfate and perchlorate. It is also equally important that the acid residue be stable to electro-oxidation in order to avoid undesirable reactions, such as the formation of a toxic gas on charge. For that reason alone chloride salts, while suitable for use in a primary lithium air battery, and generally considered to be highly innocuous and safe since they are typically known in the chemical fields as spectator ions, are in various embodiments entirely unsuitable herein as a salt in a secondary aqueous lithium air battery if upon charge chloride gas forms prior to the OER. Accordingly, in various embodiments of the instant invention the catholyte is devoid of any chloride containing salts, and even more preferably devoid of free chlorine ions in the catholyte.

In various embodiments tuning the acidity of the starting catholyte is guided by balancing at least the following two parameters: i) stability of the membrane in contact with the catholyte, and in particular the catholyte should not be so acidic as to degrade membrane performance; and ii) decomposition of lithium carbonate, the reaction of which requires a certain acid strength in order to proceed. Preferably the range of pH of the starting catholyte and/or the pH of the catholyte that is reached during charge is greater than that value which would degrade the membrane but less than about pH 4, or 3.5 or 3. The inventors have found that, when a lithium titanium phosphate solid electrolyte membrane is utilized, the pH of the catholyte is preferably greater than about 3, but should be preferably less than about 4 in order to promote significant rates for catholyte regeneration on charge.

Catholyte tuning may be achieved using a mixture of two or more inorganic salts. For example: i) 2.5 molar magnesium nitrate, 0.5 molar zinc nitrate, and 1 molar lithium nitrate; ii) 2.8 molar magnesium nitrate, 0.2 molar zinc nitrate, and 1 molar lithium nitrate; iii) 2.95 molar magnesium nitrate, 0.05 molar zinc nitrate, and 1 molar lithium nitrate.

In particular embodiments the instant Li/O$_2$ battery cells comprise a catholyte having one of the following compositions:

i) 4 molar malonic acid and 2 molar lithium nitrate;
ii) 2 molar malonic acid, 2 molar lithium hydrogen malonate and 1 molar lithium nitrate;
iii) 1 molar malonic acid, 3 molar lithium hydrogen malonate and 1 molar lithium nitrate;
iv) 0.5 molar malonic acid, 1.5 molar lithium hydrogen malonate and 1 molar lithium nitrate;
v) 4 molar imidazolium hydrogen malonate and 2 molar lithium nitrate;
vi) 4 molar imidazolium hydrogen malonate and 1 molar lithium nitrate;

vii) 2 molar citric acid and 2 molar lithium nitrate;
viii) 2 molar lithium dihydrogen citrate and 2 molar lithium nitrate;
ix) 1 molar lithium dihydrogen citrate and 1 molar lithium nitrate;
x) 2 molar imidazolium dihydrogen citrate and 2 or 1 molar lithium nitrate;
xi) 2 molar imidazolium hydrogen citrate and 2 or 1 molar lithium nitrate;
xii) 2.5 molar magnesium nitrate, 0.5 molar zinc nitrate and 1 molar lithium nitrate (pH about 3.1);
xiii) 2.8 molar magnesium nitrate, 0.2 molar zinc nitrate, and 1 molar lithium nitrate (pH about 3.5);
xiv) 2.95 molar magnesium nitrate and 0.05 molar zinc nitrate and 1 molar lithium nitrate (pH about 3.8).

Other Cell Components

With reference to FIG. 1A, the cell comprises a Li anode 1. The anode may be an alkali metal, alloy or intercalation material, for example Li metal or a Li metal alloy or Li intercalation material (e.g., lithiated carbon). In one example, a Li metal foil may be used. Lithium anodes, including intercalation anodes and lithium alloys and lithium metal anodes are well known in the lithium battery art. In preferred embodiments the anode is lithium metal (e.g., in foil or sintered form) and of sufficient thickness (i.e., capacity) to enable the cell to achieve the rated discharge capacity of the cell. The anode may take on any suitable form or construct including a green or sintered compact (such as a wafer or pellet), a sheet, film, or foil, and the anode may be porous or dense. Without limitation, the lithium anode may have a current collector (e.g., copper foil, or suitable expandable metal) pressed or otherwise attached to it in order to enhance the passage of electrons between it and the leads of the cell. Without limitation the cell may be anode or cathode limited. When anode limited, the complete discharge (corresponding to rated capacity) will substantially exhaust all the lithium in the anode. When cathode limited, some active lithium will remain subsequent to the cell delivering its rated capacity.

The anode is protected with a protective membrane architecture chemically stable to both the anode and the environment of an adjacent cathode compartment (4). The protective membrane architecture typically comprises a solid electrolyte protective membrane 2 and an interlayer 3. The solid electrolyte protective membrane is sometimes referred to herein as an ion membrane or a liquid impermeable alkali metal ion conductive solid electrolyte barrier layer. The protective membrane architecture is in ionic continuity with the Li anode 1 and is configured to selectively transport Li ions into and out of the cathode compartment 4 while providing an impervious barrier to the environment external to the anode. Protective membrane architectures suitable for use in the present invention are described in applicants' co-pending published US Applications US 2004/0197641 and US 2005/0175894 and their corresponding International Patent Applications WO 2005/038953 and WO 2005/083829, respectively, incorporated by reference herein.

Figure 1B:
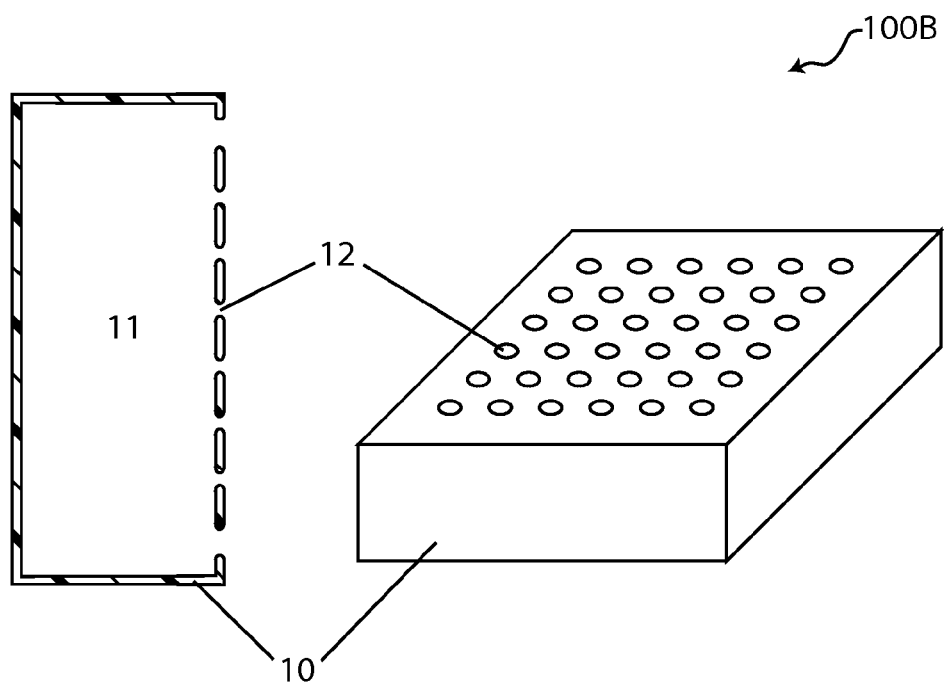
FIG. 1B shows a Li/air battery cell in accordance with the present invention enclosed in a cell case in cross sectional and perspective depictions.

With reference to FIG. 1B, there is illustrated (in cross-section (left) and perspective (right)) an embodiment of a lithium air battery cell 10 in accordance with the instant invention. The cell is disposed in a case 11 (e.g., a metal or polymeric case, including but limited to a heat sealable multilayer laminate used for that purpose). The case comprises one or more ports 12 for the passage of oxygen and moisture from the ambient air. To effectively reach the cathode and the cathode compartment, as illustrated in FIG. 1B, the case side wall of which contains the ports is adjacent to the cathode.

In many, but not necessarily all embodiments, the cell is activated by removing a barrier material (not shown) which covers the ports to prevent, prior to cell activation, premature or excessive exposure of the cathode compartment to ambient air. The cell activated by removing the barrier material (e.g., by the act of peeling off a tab (barrier material layer).

The case may further comprise an additional port (not shown) for introducing, water or catholyte into the cathode compartment after the cell has been manufactured. Without limitation, the catholyte (or water) may be introduced, prior or subsequent to one or more of the following: cell activation or initial discharge. For instance, the cell may be used in a Li/Air, or more specifically, a Li/$O_2$ flow battery, wherein the catholyte is caused to flow into, and generally through, the cathode compartment. In accordance with such embodiments the battery may contain appropriate pipeworks and pumps for circulating the catholyte may be stored external from the cell in, e.g., a suitable storage container.

FIGS. 2A-D illustrate representative protective membrane architectures from these disclosures suitable for use in the present invention. The protective membrane architectures provide a barrier to isolate a Li anode from ambient and/or the cathode side of the cell while allowing for efficient ion Li metal ion transport into and out of the anode. The architecture may take on several forms. Generally it comprises a solid electrolyte layer that is substantially impervious, ionically conductive and chemically compatible with the external ambient (e.g., air or water) or the cathode environment.

Figure 2A:
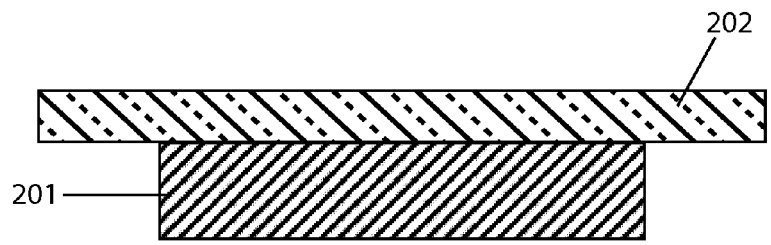
FIGS. 2A-D illustrate various alternative configurations of a protective membrane architecture in accordance with the present invention.

Referring to FIG. 2A, the protective membrane architecture can be a monolithic solid electrolyte 202 that provides ionic transport and is chemically stable to both the alkali metal anode 201 and the external environment. Examples of such materials are Na-$\beta$" alumina, $LiHfPO_4$ and NASICON, Nasiglass, $Li_5La_3Ta_2O_{12}$ and $Li_5La_3Nb_2O_{12}$. $Na_5MSi_4O_{12}$ (M: rare earth such as Nd, Dy, Gd).

More commonly, the ion membrane architecture is a composite composed of at least two components of different materials having different chemical compatibility requirements, one chemically compatible with the anode, the other chemically compatible with the exterior; generally ambient air or water, and/or battery electrolytes/catholytes. By "chemical compatibility" (or "chemically compatible") it is meant that the referenced material does not react to form a product that is deleterious to battery cell operation when contacted with one or more other referenced battery cell components or manufacturing, handling, storage or external environmental conditions. The properties of different ionic conductors are combined in a composite material that has the desired properties of high overall ionic conductivity and chemical stability towards the anode, the cathode and ambient conditions encountered in battery manufacturing. The composite is capable of protecting an alkali metal anode from deleterious reaction with other battery components or ambient conditions while providing a high level of ionic conductivity to facilitate manufacture and/or enhance performance of a battery cell in which the composite is incorporated.

Figure 2B:
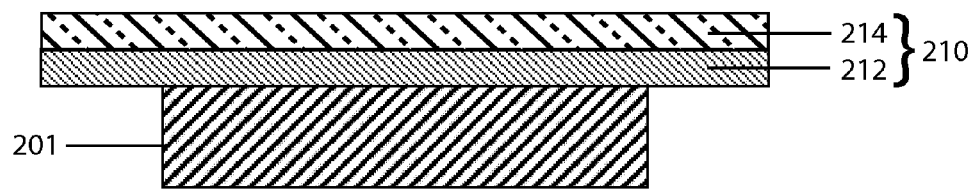
Figure 2C:
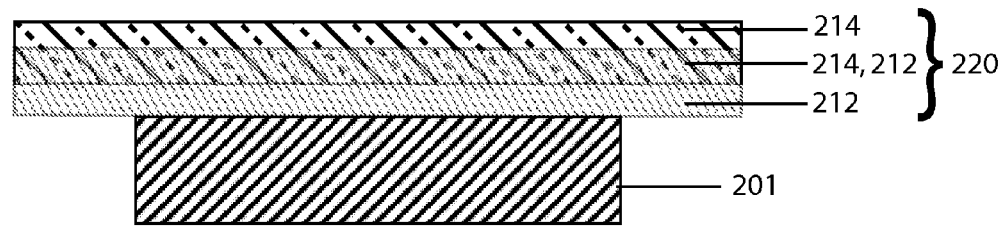

Referring to FIG. 2B, the protective membrane architecture can be a composite solid electrolyte 210 composed of discrete layers, whereby the first material layer 212 (also sometimes referred to herein as "interlayer") is stable to the alkali metal anode 201 and the second material layer 214 is stable to the external environment. Alternatively, referring to FIG. 2C, the protective membrane architecture can be a composite solid electrolyte 220 composed of the same materials, but with a graded transition between the materials rather than discrete layers.

Generally, the solid state composite protective membrane architectures (described with reference to FIGS. 2B and C) have a first and second material layer. The first material layer (or first layer material) of the composite is ionically conductive, and chemically compatible with an alkali metal electrode material. Chemical compatibility in this aspect of the invention refers both to a material that is chemically stable and therefore substantially unreactive when contacted with an alkali metal electrode material. It may also refer to a material that is chemically stable with air, to facilitate storage and handling, and reactive when contacted with an alkali metal electrode material to produce a product that is chemically stable against the alkali metal electrode material and has the desirable ionic conductivity (i.e., a first layer material). Such a reactive material is sometimes referred to as a "precursor" material. The second material layer of the composite is substantially impervious, ionically conductive and chemically compatible with the first material. Additional layers are possible to achieve these aims, or otherwise enhance electrode stability or performance. All layers of the composite have high ionic specific conductivity, at least $10^{-7}$ S/cm, generally at least $10^{-6}$ S/cm, for example at least $10^{-5}$ S/cm to $10^{-4}$ S/cm, and as high as $10^{-3}$ S/cm or higher so that the overall ionic conductivity of the multi-layer protective structure is at least $10^{-7}$ S/cm and as high as $10^{-3}$ S/cm or higher.

Figure 2D:
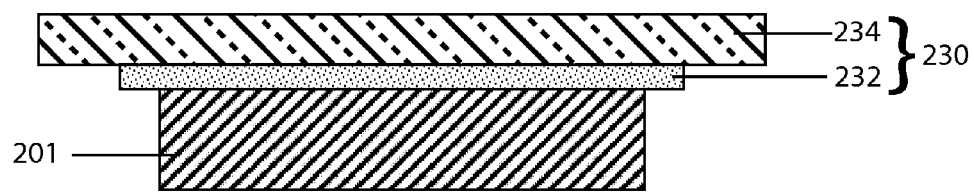

A fourth suitable protective membrane architecture is illustrated in FIG. 2D. This architecture is a composite 230 composed of an interlayer 232 between the solid electrolyte 234 and the alkali metal anode 201 whereby the interlayer includes a liquid or gel phase anolyte. Thus, the architecture includes an alkali metal ion conducting separator layer with a non-aqueous anolyte (i.e., electrolyte about the anode), the separator layer being chemically compatible with the alkali metal and in contact with the anode; and a solid electrolyte layer that is substantially impervious (pinhole- and crack-free) ionically conductive layer chemically compatible with the separator layer and aqueous environments and in contact with the separator layer. The solid electrolyte layer of this architecture (FIG. 2D) generally shares the properties of the second material layer for the composite solid state architectures (FIGS. 2B and C). Accordingly, the solid electrolyte layer of all three of these architectures will be referred to below as a second material layer or second layer.

A wide variety of materials may be used in fabricating protective composites in accordance with the present invention, consistent with the principles described above. For example, in the solid state embodiments of Figs. B and C, the first layer (material component), in contact with the alkali metal, may be composed, in whole or in part, of alkali metal nitrides, alkali metal phosphides, alkali metal halides alkali metal sulfides, alkali metal phosphorous sulfides, or alkali metal phosphorus oxynitride-based glass. Specific examples include $Li_3N$, $Li_3P$, $LiI$, $LiBr$, $LiCl$, $LiF$, $Li_2S$—$P_2S_5$, $Li_2S$—$P_2S_5$—$LiI$ and LiPON. Alkali metal electrode materials (e.g., lithium) may be applied to these materials, or they may be formed in situ by contacting precursors such as metal nitrides, metal phosphides, metal halides, red phosphorus, iodine, nitrogen or phosphorus containing organics and polymers, and the like with lithium. A particularly suitable precursor material is copper nitride (e.g., $Cu_3N$). The in situ formation of the first layer may result from an incomplete conversion of the precursors to their lithiated analog. Nevertheless, such incomplete conversions meet the requirements of a first layer material for a protective composite in accordance with the present invention and are therefore within the scope of the invention.

For the anolyte interlayer composite protective architecture embodiment (FIG. 2D), the protective membrane architecture has an alkali metal ion conducting separator layer chemically compatible with the alkali metal of the anode and in contact with the anode, the separator layer comprising a non-aqueous anolyte, and a substantially impervious, ionically conductive layer ("second" layer) in contact with the separator layer, and chemically compatible with the separator layer and with the exterior of the anode. The separator layer can be composed of a semi-permeable membrane impregnated with or otherwise including an organic anolyte. For example, the semi-permeable membrane may be a micro-porous polymer, such as are available from Celgard, Inc. The organic anolyte may be in the liquid or gel phase. For example, the anolyte may include a solvent selected from the group consisting of organic carbonates, ethers, lactones, sulfones, etc., and combinations thereof, such as EC, PC, DEC, DMC, EMC, 1,2-DME or higher glymes, THF, 2MeTHF, sulfolane, and combinations thereof. 1,3-dioxolane may also be used as an anolyte solvent, particularly but not necessarily when used to enhance the safety of a cell incorporating the structure. When the anolyte is in the gel phase, gelling agents such as polyvinylidine fluoride (PVdF) compounds, hexafluoropropylene-vinylidene fluoride copolymers (PVdf-HFP), polyacrylonitrile compounds, cross-linked polyether compounds, polyalkylene oxide compounds, polyethylene oxide compounds, and combinations and the like may be added to gel the solvents. Suitable anolytes will, of course, also include alkali metal salts, such as, in the case of lithium, for example, $LiPF_6$, $LiBF_4$, $LiAsF_6$, $LiSO_3CF_3$ or $LiN(SO_2C_2F_5)_2$. In the case of sodium, suitable anolytes will include alkali metal salts such as $NaClO_4$, $NaPF_6$, $NaAsF_6$ $NaBF_4$, $NaSO_3CF_3$, $NaN(CF_3SO_2)_2$ or $NaN(SO_2C_2F_5)_2$, One example of a suitable separator layer is 1 M $LiPF_6$ dissolved in propylene carbonate and impregnated in a Celgard microporous polymer membrane.

The second layer (material component) of the protective composite may be composed of a material that is substantially impervious, ionically conductive and chemically compatible with the first material or precursor, including glassy or amorphous metal ion conductors, such as a phosphorus-based glass, oxide-based glass, phosphorus-oxynitride-based glass, sulpher-based glass, oxide/sulfide based glass, selenide based glass, gallium based glass, germanium-based glass, Nasiglass; ceramic alkali metal ion conductors, such as lithium beta-alumina, sodium beta-alumina, Li superionic conductor (LISICON), Na superionic conductor (NASICON), and the like; or glass-ceramic alkali metal ion conductors. Specific examples include LiPON, $Li_3PO_4.Li_2S.SiS_2$, $Li_2S.GeS_2.Ga_2S_3$, $Li_2O.11Al_2O_3$, $Na_2O.11Al_2O_3$, $(Na,Li)_{1+x}Ti_{2-x}Al_x(PO_4)_3$ $(0.1 \leq x \leq 0.9)$ and crystallographically related structures, $Li_{1+x}Hf_{2-x}Al_x(PO_4)_3$ $(0.1 \leq x \leq 0.9)$, $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, Na-Silicates, $Li_{0.3}La_{0.5}TiO_3$, $Na_5MSi_4O_{12}$ (M: rare earth such as Nd, Gd, Dy) $Li_5ZrP_3O_{12}$, $Li_5TiP_3O_{12}$, $Li_3Fe_2P_3O_{12}$ and $Li_4NbP_3O_{12}$, and combinations thereof, optionally sintered or melted. Suitable ceramic alkali metal ion conductors are described, for example, in U.S. Pat. No. 4,985,317 to Adachi et al., incorporated by reference herein in its entirety and for all purposes.

A particularly suitable glass-ceramic material for the second layer of the protective composite is a lithium ion conductive glass-ceramic having the following composition:

| Composition | mol % |
|---|---|
| $P_2O_5$ | 26-55% |
| $SiO_2$ | 0-15% |
| $GeO_2 + TiO_2$ | 25-50% |
| in which $GeO_2$ | 0-50% |
| $TiO_2$ | 0-50% |
| $ZrO_2$ | 0-10% |
| $M_2O_3$ | 0-10% |
| $Al_2O_3$ | 0-15% |
| $Ga_2O_3$ | 0-15% |
| $Li_2O$ | 3-25% | and containing a predominant crystalline phase composed of $Li_{1+x}(M,Al,Ga)_x(Ge_{1-y}Ti_y)_{2-x}(PO_4)_3$ where $X \leq 0.8$ and $0 \leq Y \leq 1.0$, and where M is an element selected from the group consisting of Nd, Sm, Eu, Gd, Tb, Dy, Ho, Er, Tm and Yb and/or $Li_{1+x+y}Q_xTi_{2-x}Si_yP_{3-y}O_{12}$ where $0 < X \leq 0.4$ and $0 < Y \leq 0.6$, and where Q is Al or Ga. The glass-ceramics are obtained by melting raw materials to a melt, casting the melt to a glass and subjecting the glass to a heat treatment. Such materials are available from OHARA Corporation, Japan and are further described in U.S. Pat. Nos. 5,702,995, 6,030,909, 6,315,881 and 6,485,622, incorporated herein by reference.

Another particularly suitable material for the second layer of the protective composite are lithium ion conducting oxides having a garnet like structures. These include $Li_6BaLa_2Ta_2O_{12}$; $Li_7La_3Zr_2O_{12}$, $Li_5La_3Nb_2O_{12}$, $Li_5La_3M_2O_{12}$ (M=Nb, Ta)$Li_{7+x}A_xLa_{3-x}Zr_2O_{12}$ where A may be Zn. These materials and methods for making them are described in U.S. Patent Application Pub. No.: 2007/0148533 (application Ser. No. 10/591,714) and is hereby incorporated by reference in its entirety and suitable garnet like structures, are described in International Patent Application Pub. No.: WO/2009/003695 which is hereby incorporated by reference for all that it contains.

The composite should have an inherently high ionic conductivity. In general, the ionic conductivity of the composite is at least $10^{-7}$ S/cm, generally at least about $10^{-6}$ to $10^{-5}$ S/cm, and may be as high as $10^{-4}$ to $10^{-3}$ S/cm or higher. The thickness of the first precursor material layer should be enough to prevent contact between the second material layer and adjacent materials or layers, in particular, the alkali metal of the anode. For example, the first material layer for the solid state membranes can have a thickness of about 0.1 to 5 microns; 0.2 to 1 micron; or about 0.25 micron. Suitable thickness for the anolyte interlayer of the fourth embodiment range from 5 microns to 50 microns, for example a typical thickness of Celgard is 25 microns.

The thickness of the second material layer is preferably about 0.1 to 1000 microns, or, where the ionic conductivity of the second material layer is about $10^{-7}$ S/cm, about 0.25 to 1 micron, or, where the ionic conductivity of the second material layer is between about $10^{-4}$ about $10^{-3}$ S/cm, about 10 to 1000 microns, preferably between 1 and 500 microns, and more preferably between 10 and 100 microns, for example about 20 microns.

Seals and methods of making seals which are particularly suitable for sealing protected anodes described hereinabove and elsewhere, including compliant and rigid seals, are fully described in US Patent Application No.: 2007/0037058 and US Patent Application No.: US 2007/0051620 to Visco et al., and are hereby incorporated by reference in their entirety, particularly for their description of battery cell seal architectures.

Cathode Compartment

Referring again to FIG. 1A, the cathode compartment 4 comprises an air cathode 5 (also sometimes referred to herein as "oxygen electrode") and an aqueous catholyte 6, which is disposed between the cathode 5 and the solid electrolyte protective membrane 2 and is in direct contact with the cathode 5 for reducing molecular oxygen. The cathode compartment 4 can further comprise one or more porous solid reservoir structures 7 disposed between the solid electrolyte protective membrane 2 and the air cathode 5. The aqueous catholyte 6 and porous solid reservoir 7 are represented as separate layers in FIG. 1A for ease of illustration, however they may be and often are co-extensive in many embodiments of the invention.

Reservoir Structures

It has been found that several types of porous structures can be effectively used as reservoir layers in Li/air aqueous cells in accordance with the present invention. These porous layers are chemically inert and compatible with the cathode and with the aqueous catholyte. In particular, they do not react with the catholyte components, cannot be oxidized by the cathode, and do not participate in the cell discharge as reagents. The first function of a porous reservoir disposed between the cathode and the protective membrane is that it should be loaded with the aqueous catholytes and/or solid phase active compounds or active agents as described above. Solid structure(s) used as reservoir layer(s) have high porosity. It has also been found that reservoir layers can have a second function of accommodating both liquid and solid cell discharge products, thereby increasing the depth of discharge and improving cell characteristics. Additionally, the porous space of the reservoir layer retains water that is absorbed by the hygroscopic components of the catholyte during cell discharge and storage thereby making it available for discharge reactions.

Porous reservoir structures suitable for use herein are described elsewhere and will not be repeated herein but are fully described U.S Patent Publication No. US 2009/0311596, hereby incorporated by reference in its entirety. As described in detail in the aforementioned reference, suitable porous reservoir structures include, but are not limited to the following: metal oxides (e.g., porous $ZrO_2$), in particular, Zirconia cloth from Zircar Products, Inc.); carbonaceous porous reservoirs, including carbon and graphite cloths and felts, carbon papers; e.g., WDF graphite felt and VDG carbon felt from National Electric Carbon Products, Inc. and carbon felt from Fiber Materials, Inc. can be used; polymeric porous reservoirs such as polymeric layers with high porosity (e.g., at least 50%, for example 90%) can be used as reservoir structures, an example of such a reservoir is polypropylene fiber materials; hydrogels are also suitable reservoir layers, typically these are hydrophilic polymer networks that can absorb water.

Air Cathodes

In embodiments of the invention, an air cathode adapted from those used in Zn/Air batteries or low temperature fuel cells (e.g., PEM), and which are well known to those of skill in that art, may be used as the air cathode in the inventive Li/air battery cells described herein.

In various embodiments, the instant Li/air cell comprises an air cathode comprising, at least, a first sectional layer comprising a first gas diffusion (e.g., Teflon) backing layer (which is positioned adjacent to the air side in the cell), a wet-proof gas-supply layer, for example made of Teflon and acetylene black, a metal screen current collector and an active carbon layer.

The type of metal used for the current collector may be chosen based on its chemical stability in the cell, specifically its stability in contact with the aqueous catholyte. In specific embodiments the metal screen current collector may be composed of stainless steel, nickel copper, titanium or alloys thereof.

One or more electrocatalysts may be used. In some embodiments a single electrocatalyst is used which is capable of facilitating both the oxygen evolution reaction (OER) on charge and the oxygen reduction reaction (OER) on discharge. In other embodiments two or more catalysts are incorporated in the cathode. A first electrocatalyst material for catalyzing the OER and stable down to, and preferably beyond, the potential at which ORR takes place; and a second electrocatalyst for catalyzing the ORR and stable up to, and preferably beyond, the potential at which OER takes place.

The active carbon layer may contain the electrocatalyst or may be uncatalyzed. One particularly suitable electrocatalyst that may be used to catalyze one or both of the OER or ORR is iridium oxide compounds including compositionally pure iridium oxide and solid solution compounds thereof.

Air cathodes suitable for use herein are described in detail elsewhere. In particular U.S. Pat. Nos. 7,645,543; 7,282,295; and U.S Patent Publication No.: US 2009/0311596 all of which are hereby incorporated by reference in their entirety, and in particular for their description of air cathode structure and composition.

Itemized Specific Embodiments

The following is an itemization of some specific embodiments of the invention:

1. An alkali metal/oxygen electrochemical energy storage cell, the cell comprising:

an anode comprising an alkali metal electroactive component material;

a cathode on or at which molecular oxygen is electro-reduced during cell discharge, the cathode in alkali metal ion communication with the anode;

a catholyte comprising water and one or more evaporative-loss resistant and/or polyprotic active compounds dissolved in water that partake in a cell discharge reaction and effectuate cathode capacity for discharge in the acidic region, the catholyte in contact with said cathode; and a protective membrane architecture interposed between the cathode and the anode, the protective membrane architecture having a first and second major surface, the first surface adjacent to the cathode and in contact with the catholyte and the second surface adjacent to the anode; and wherein the protective membrane architecture solely allows through transport of the alkali metal ion and prevents liquids from contacting the alkali metal anode.

2. The cell of item 1, wherein the catholyte comprises:
water; and
a carboxylic acid dissolved in water, the acid represented by the following general formula

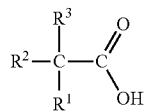

wherein $R^1$ represents an organic radical;
wherein $R^2$ represents H or an organic radical; and
wherein $R^3$ represents H or an organic radical.

3. The cell of item 2, wherein at least one of the organic radicals represented by $R^1$, $R^2$ or $R^3$ comprises a carboxyl group.

4. The cell of item 3, wherein the carboxylic acid is malonic acid, thus $R^2$ and $R^3$ represent H and $R^1$ represents a carboxyl group.

5. The cell of item 2, wherein at least one of $R^1$, $R^2$ and $R^3$ represents an organic radical selected from the group consisting of an optionally substituted $C_1$-$C_{10}$ alkyl group, optionally substituted $C_2$-$C_{10}$ alkenyl group, optionally substituted $C_2$-$C_{10}$ alkynyl group.

6. The cell of item 2, wherein at least one of $R^1$, $R^2$ and $R^3$ represents an organic radical selected from the group consisting of an optionally substituted $C_4$-$C_{10}$ cycloalkyl, optionally substituted $C_4$-$C_{10}$ cycloalkenyl, and optionally substituted 3-10 membered heterocyclyl.

7. The cell of item 2, wherein at least one of $R^1$, $R^2$ and $R^3$ represent an organic radical selected from the group consisting of an optionally substituted carbo- and heterocyclic 5-10 membered aryl.

8. The cell of item 2, wherein the carboxylic acid is selected from the group consisting of malonic acid, glutaric acid, and methylsuccinic acid.

9. The cell of item 2, wherein the equivalent weight of the acid that partakes in the cell discharge reaction, is selected from the range of values consisting of 50-70 g/equivalent of $H^+$; 71-90 g/equivalent of $H^+$; 91-110 g/equivalent of $H^+$.

10. The cell of item 2, wherein the concentration of the carboxylic acid in the catholyte is greater than 1 molar.

11. The cell of item 2, wherein the concentration of the carboxylic acid in the catholyte is 0.5 molar or greater.

12. The cell of item 2, wherein the concentration of the carboxylic acid in the catholyte is 0.25 molar or greater.

13. The cell of item 2, wherein the concentration of the carboxylic acid in the catholyte is between 0.05 molar and 1 molar.

14. The cell of item 2, wherein the catholyte further comprises solid phase carboxylic acid in contact with its solution.

15. The cell of item 2, wherein the catholyte is saturated with the carboxylic acid.

16. The cell of item 2, wherein the carboxylic acid is malonic acid.

17. The cell of item 16, wherein the concentration of malonic acid in the catholyte is selected from the molar range consisting of 0.5 molar to 2 molar, 2 molar to 4 molar, and greater than 4 molar.

18. The cell of item 2, further comprising a lithium salt dissolved in water.

19. The cell of items 18, wherein the lithium salt is selected from the group consisting of lithium nitrate, lithium sulfate, and lithium perchlorate.

20. The cell of item 18, wherein the lithium salt is lithium nitrate.

21. The cell of item 18, wherein the concentration of the lithium salt in the catholyte is selected from the molar range consisting of 0.5 molar to 1 molar, 1 molar to 2 molar, and greater than 2 molar.

22. The cell of item 20, wherein the carboxylic acid is malonic acid and the concentration of malonic acid in the catholyte is about 2 molar or about 4 molar or therebetween, and further wherein the concentration of the lithium nitrate salt is about 2 molar.

23. The cell of item 20, wherein the carboxylic acid is malonic acid and the concentration of malonic acid in the catholyte is about 0.5 molar, and further wherein the concentration of the lithium nitrate salt is about 1 molar.

24. The cell of any of items 1-23, wherein the alkali metal/oxygen electrochemical energy storage cell is a lithium oxygen battery cell.

25. The cell of item 24, wherein the lithium oxygen battery cell is a lithium air battery cell open to ambient air for accessing active oxygen that is reduced at the cathode of the cell during discharge.

26. The cell any of items 1-25 wherein the pH of the catholyte prior to initial discharge is less than 7, less than 6, less than 5, less than 4, or less than 3.

27. The cell any of items 1-25 wherein the pH of the catholyte prior to initial discharge is in the range of 7 to 3, in the range of 6 to 3, in the range of 5 to 3, or in the range of 4 to 3.

28. The cell of item 1, wherein the catholyte comprises:
water; and
an amino acid dissolved in water, the amino acid represented by the following general formula

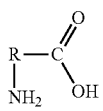

wherein R represents an aliphatic or aromatic optionally substituted organic divalent radical.

29. The cell of item of 28, wherein the nitrogen atom of the amino group is protonated with a proton of a strong acid yielding amino acid aminium salt.

30. The cell of item 29, wherein the amino acid aminium salt is selected from the group consisting of an amino acid nitrate, an amino acid hydrosulfate, an amino acid sulfate, and an amino acid perchlorate.

31. The cell of item 28, wherein the amino acid is selected from the group glycine, alanine, proline, and aminomalonic acid.

32. The cell of item 1, wherein the catholyte comprises:
water; and
a hydroxy acid dissolved in water, the hydroxy acid represented by the following general formula

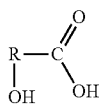

wherein R represents an aliphatic or aromatic optionally substituted organic divalent radical.

33. The cell of item 32, wherein the acid is selected from the group consisting of citric acid, glycolic acid, lactic acid, 2-hydroxypropionic acid, 3-hydroxypropionic acid, 2-hydroxybutyric acid, 3-hydroxybutyric acid.

34. The cell of item 32, wherein the carboxylic acid is citric acid.

35. The cell of item 34, wherein the concentration of citric acid is between 0.5 molar to 2 molar.

36. The cell of item 1, wherein the catholyte comprises:
a metal acid salt of a polycarboxylic acid comprising a carboxylate anion, one or more acidic protons, and one or more metal cations or a neutral or acid onium salt of polycarboxylic acid comprising a carboxylate anion, one or more onium cations, and one or more acidic protons if the onium salt is an acid onium salt;
wherein the metal acid salt or the onium neutral or acid salt is present in the catholyte prior to actively operating the battery cell.

37. The cell of item 36, wherein the cation of the metal acid salt is the alkali metal cation.

38. The cell of item 36, wherein the cation of the metal acid salt is lithium.

39. The cell of item 36, wherein the polycarboxylic acid from which the acid salt is derived has a first acidic proton that is neutralized in the partial neutralization process and a second acidic proton that is not neutralized said process, and further wherein the second acidic proton actively partakes in the cell discharge reaction.

40. The cell of item 36, wherein the metal acid salt is an alkali metal hydrogen carboxylate.

41. The cell of item 36, wherein the metal acid salt is a lithium hydrogen carboxylate.

42. The cell of item 36, wherein the metal acid salt is selected from the group consisting of lithium hydrogen malonate, lithium dihydrogen citrate, and dilithium hydrogen citrate.

43. The cell of item 36, wherein the acid onium salt is an acid aminium salt where an aminium cation contains nitrogen atom protonated by a polycarboxylic acid.

44. The cell of item 43, wherein the acid aminium salt has two types of acidic protons: a first type on a carboxylic group, and a second type on a primary, secondary, or tertiary ammonium cation, both of which are available to actively partake in a discharge reaction of the cell.

45. The cell of item 43, wherein the aminium cation is imidazolium.

46. The cell of item 43, wherein the acid aminium salt is an imidazolium hydrogen carboxylate.

47. The cell of item 43, wherein the aminium acid salt is selected from the group consisting of imidazolium hydrogen malonate, imidazolium hydrogen citrate, and imidazolium dihydrogen citrate.

48. The cell of item 1, further comprising a non-aqueous protic solvent.

49. The cell of item 48, wherein the non-aqueous protic solvent is a mono- or polyatomic alcohol.

50. The cell of item 1, further comprising a non-aqueous aprotic solvent.

51. The cell of item 50, wherein the non-aqueous aprotic solvent is selected from the group consisting of DMF and DMSO.

52. The cell of item 1, wherein the catholyte comprises:
water; and
an inorganic acid salt selected from the group consisting of lithium dihydrogen phosphate and lithium hydrogen selenite, and combinations thereof.

53. The cell of item 1, wherein the catholyte comprises:
water;
an aprotic solvent; and
a carboxylic acid derivative, wherein the hydroxyl moiety of the carboxyl group is replaced by an atom or a group of atoms comprising an electronegative atom, and the chemical group is not a hydroxyl group.

54. The cell of item 53, wherein said electronegative atom is selected from the group consisting of nitrogen, oxygen or a halogen.

55. The cell of item 53, wherein the carboxylic acid derivative is represented by the following general formula:

wherein R represents an aliphatic or aromatic optionally substituted organic radical and X represents atom or a group of atoms comprising an electronegative atom, and further wherein the group X is not represented by OH or nitrile represented by the general formula

where R is an organic aliphatic or aromatic radical.

56. The cell of item 55, wherein said electronegative atom is selected from the group consisting of nitrogen, oxygen and halogen.
57. The cell of item 55, wherein carboxylic acid derivative is selected from the group consisting of an acyl halide, an anhydride, an ester, an amide, and a nitrile.
58. The cell of item 53, wherein the carboxylic acid derivative is an organic ester represented by the general formula:

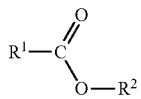

wherein $R^1$ represents an aliphatic or aromatic optionally substituted organic radical; and
wherein $R^2$ represents an aliphatic or aromatic optionally substituted organic radical.
59. The cell of item 58:
wherein $R^1$ represents the organic radical selected from the group consisting an optionally substituted $C_1$-$C_{10}$ alkyl group, optionally substituted $C_2$-$C_{10}$ alkenyl group, optionally substituted $C_2$-$C_{10}$ alkynyl group, optionally substituted $C_4$-$C_{10}$ cycloalkyl, optionally substituted $C_4$-$C_{10}$ cycloalkenyl, optionally substituted 3-10 membered heterocyclyl, optionally substituted carbo- and heterocyclic 5-10 membered aryl, optionally substituted carbonyl.
wherein $R^2$ an optionally substituted $C_1$-$C_{10}$ alkyl group, optionally substituted $C_2$-$C_{10}$ alkenyl group, optionally substituted $C_2$-$C_{10}$ alkynyl group, optionally substituted $C_4$-$C_{10}$ cycloalkyl, optionally substituted $C_4$-$C_{10}$ cycloalkenyl, optionally substituted 3-10 membered heterocyclyl, optionally substituted carbo- and heterocyclic 5-10 membered aryl, optionally substituted carbonyl.
60. The cell of item 58:
wherein $R^1$ represents the organic radical selected from the group consisting of benzyl, phenyl, —COOR, —CH$_2$COOR, —CH$_2$CH$_2$COOR, CH$_2$CH$_2$CH$_2$COOR, —CH$_2$CN, —CH$_2$CF$_3$, CCl$_2$, C$_5$H$_{11}$, and C$_5$H$_{13}$;
wherein $R^2$ represents the organic radical selected from the group consisting of —CH$_2$—CH$_2$OH, —CH$_2$—CH$_2$OR, —CH$_2$—CH(OH)—CH$_2$OH, —CH$_2$—CH(OR)—CH$_2$OH, —CH$_2$—CH(OH)—CH$_2$OR, —CH$_2$—CH(OR)—CH$_2$OR, —(CH$_2$)$_2$—O—(CH$_2$)$_2$OR; and
wherein R is an aliphatic or aromatic optionally substituted organic radical.
61. The cell of item 58, wherein the carboxylic acid derivative is an organic ester selected from the group consisting of diethylene glycol dibenzoate, 2-methoxyethyl cyanoacetate, ethylene glycol monosalicylate, and ethylene brassylate.
62. The cell of item 53, wherein the carboxylic acid derivative is a lactone.
63. The cell of item 62, wherein the lactone is represented by the general formula

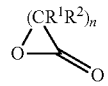

wherein n is from 2 to 4.
wherein $R^1$ represents an aliphatic or aromatic optionally substituted organic radical; and
wherein $R^2$ represents an aliphatic or aromatic optionally substituted organic radical.
64. The cell of item 62, wherein the lactone is selected from the group consisting of γ-butyrolactone, δ-gluconolactone, and glutaric anhydride.
65. The cell of item 1, wherein the catholyte comprises:
water;
an aprotic solvent; and
an ester of an inorganic acid represented by the general formula X(OR)$_n$
wherein R is an aliphatic or aromatic optionally substituted organic radical;
X=N(=O)$_2$, S(=O)$_2$, or P=O; and
n is basicity of an acid from which the ester was derived.
66. The cell of item 65, wherein the ester is ester of sulfuric acid that is represented by the general formula:

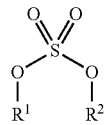

wherein $R^1$ is an aliphatic or aromatic optionally substituted organic radical; and
wherein $R^2$ is an aliphatic or aromatic optionally substituted organic radical.
67. The cell of item 65, wherein the ester is ester of nitric acid that is represented by the general formula:

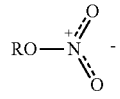

wherein R is an aliphatic or aromatic optionally substituted organic radical.
68. The cell of item 65, wherein the ester is phosphate ester that is represented by the following general formula

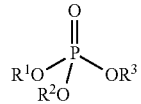

wherein $R^1$ is an aliphatic or aromatic optionally substituted organic radical;
wherein $R^2$ is selected from the group consisting of an aliphatic or aromatic optionally substituted organic radical, and hydrogen atom; and wherein R³ is selected from the group consisting of an aliphatic or aromatic optionally substituted organic radical, and hydrogen atom.
69. The cell of item 68, wherein the phosphate ester is a phosphate triester; and
wherein R² is an aliphatic or aromatic optionally substituted organic radical; and
wherein R³ is an aliphatic or aromatic optionally substituted organic radical.
70. The cell of item 69 wherein the phosphate triester is selected from the group consisting of trimethyl phosphate, triethyl phosphate, tripropyl phosphate, tributyl phosphate, and tris(2-butoxyethyl) phosphate.
71. The cell of item 68, wherein the phosphate ester is a phosphate diester; and
wherein R² is an hydrogen atom and R³ is an aliphatic or aromatic optionally substituted organic radical.
72. The cell of item 1, wherein the catholyte comprises:
water; and
an organic acid or an amide comprising an element selected from the group consisting of sulfur, nitrogen and phosphorus.
73. The cell of item 70, wherein the organic acid or amide is sulfonic acid.
74. The cell of item 71, wherein the sulfonic acid is represented by the following general formula

and
R is selected from the group consisting of an aliphatic and an aromatic optionally substituted organic radical.
75. The cell of item 73, wherein the sulfonic acid is selected from the group consisting of:
MES (2-(N-Morpholino)ethanesulfonic acid), MOPS (3-(N-Morpholino)propanesulfonic acid), BES (N,N-Bis(2-hydroxyethyl)-2-aminoethanesulfonic acid), TES (2-[(2-Hydroxy-1,1-bis(hydroxymethyl)ethyl)amino]ethanesulfonic acid), TAPSO (2-Hydroxy-3-[tris(hydroxymethyl)methylamino]-1-propanesulfonic acid), N-[Tris(hydroxymethyl)methyl]-3-amino-2-hydroxypropanesulfonic acid), HEPPS (4-(2-Hydroxyethyl)-1-piperazinepropanesulfonic acid), CHES (2-(Cyclohexylamino)ethanesulfonic acid), and 3-Aminobenzenesulfonic acid.
76. The cell of item 75, wherein the sulfonic acid is selected from the group consisting of MES, MOPS, and HEPPS.
77. The cell of item 72 wherein the organic acid or amide is amide of sulfonic acid (sulfonamide).
78. The cell of item 77, wherein the sulfonamide is represented by the general formula

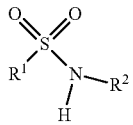

wherein R¹ is an aliphatic or aromatic optionally substituted organic radical; and
wherein R² is an aliphatic or aromatic optionally substituted organic radical.
79. The cell of item 78, wherein the sulfonamide is selected from the group consisting of o-, m-, or p-aminobenzenesulfonamide; o-, m-, or p-methylbenzenesulfonamide, o-, m-, or p-cyanobenzenesulfonamide, and 4,4'-diaminobenzenesulfanilide.
80. The cell of item 1, wherein the catholyte comprises:
water; and
a phenol represented by the general formula

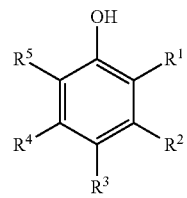

wherein $R^1$-$R^5$ are an aliphatic or aromatic optionally substituted organic radical.
81. The cell of item 80, wherein the substituents $R^1$, $R^2$, $R^3$, $R^4$, $R^5$ are selected from the group consisting of H, OH, CH₃, C₂H₅, C₃H₇, NH₂, NO₂, CN, COOH, SO₃H, C(R)═O, F, Cl, Br, I, CF₃, N(R)₃⁺, COOR, CONH₂, CCl₃, OR, N(R)₂; and
wherein R is an aliphatic or aromatic optionally substituted organic radical.
82. The cell of item 80, wherein the phenol is selected from the group consisting of resorcinol, 2-methylresorcinol, gallic acid, 4-nitrocathecol, 4-hydroxybenzoic acid, 2-nitroresorcinol.
83. The cell of item 80, wherein the phenol is α-resorcylic acid or α-resorcylonitrile.
84. The cell of item 1, wherein the catholyte comprises:
water; and
an aminium salt dissolved in water.
85. The cell of item 84, wherein the aminium salt is represented by the general formula (HNR¹R²R³)⁺X⁻, and X⁻ represents acid residue (anion), R¹, R² and R³ may be hydrogen atom, and at least one of R¹, R² and R³ is an aliphatic or aromatic optionally substituent organic radical.
86. The cell of item 85, wherein X⁻ is an inorganic anion selected from the group of nitrate, perchlorate, and sulfate anions
87. The cell of item 85, wherein X⁻ is a nitrate anion.
88. The cell of item 84, wherein the salt is selected from aniline nitrate, diethylenetriamine nitrate, ethanolamine nitrate, 2-methyl-1-pyrroline nitrate, methoxyamine nitrate, N-methoxymethylamine nitrate, 1-benzoylpiperazine nitrate, N-methylhydroxylamine nitrate, 2-aminocyanopropane nitrate, N,N-diethylcyanoacetamide nitrate, 2,2-diethylaminopropionitrile nitrate, 2-amino-2-cyanoproapne, dimethylamniacetonitrile nitrate, piperazine dinitrate, N,N-dimethylethylenediamine dinitrate, N-ethylmorpholine nitrate, and triethanolamine nitrate
89. The cell of item 84, wherein the salt is selected from the group consisting of salts of N-heterocyclic aliphatic or aromatic compounds.
90. The cell of item 84, wherein salt is nitrate.
91. The cell of item 90, wherein the salt is selected from the group consisting of imidazolium nitrate, 2-methylimidazolium nitrate, 4-hydroxymethyl imidazolium nitrate, 4-hydroxybenzimidazolium nitrate, 4-methoxybenzimidazolium nitrate, 4-(N-methylacetamido)pyridinium nitrate, o-, m-, p-methylpyridinium nitrate, o-, m-, p-ethylpyridinium nitrate, 2-methoxypyridinium nitrate, 3-methoxypyridinium nitrate, 3-hydroxypyridinium nitrate, 4-hydroxypyridinium nitrate, 3-fluoropyridinium nitrate, 3-bromopyridinium nitrate, 3-sulfoxypyridinium nitrate, 3-aminopyridazinium nitrate, 3-carboxypyridinium nitrate, 4-methoxypyridazinium nitrate, and 2-amino-4,6-dimethyl pyrazinium nitrate.

92. The cell of item 91, wherein the salt is imidazolium nitrate.

93. The cell of item 1, wherein the catholyte comprises:
    water; and
    an ammonium salt.

94. The cell of item 93, wherein the ammonium salt is represented by the general formula $(NH_4^+)X^-$, wherein $X^-$ is the acid residue anion.

95. The cell of item 1, wherein the catholyte comprises:
    water; and
    a first salt dissolved in water, the salt derived from strong acid and weak base.

96. The cell of item 95, wherein the first salt is a nitrate.

97. The cell of item 96 wherein the first salt is selected from the group consisting of zinc nitrate and magnesium nitrate.

98. The cell of item 95, further comprising a second salt dissolved in water, the second salt derived from strong acid and weak base, and further wherein the second salt composition is different than that of the first salt.

99. The cell of item 98, wherein the second is salt selected from the group consisting of zinc nitrate and magnesium nitrate.

100. The cell of item 99, wherein prior to initial cell discharge the molar concentration of dissolved magnesium nitrate is at least five times larger than the molar concentration of dissolved zinc nitrate.

101. The cell of item 100, wherein the concentration of magnesium nitrate is in the range of 2-3 molar and the concentration of zinc nitrate is in the range of 0.1 to 1 molar.

102. The cell of item 99, further comprising a lithium salt.

103. The cell of item 102, wherein the lithium salt is lithium nitrate.

104. The cell of item 103, wherein the catholyte formulation is selected from the group consisting of: i) the first salt about 2.5 molar, the second salt about 0.5 molar and the lithium nitrate about 1 molar; ii) the first salt about 2.8 molar, the second salt about 0.2 molar and the lithium nitrate about 1 molar; iii) the first salt about 2.95 molar, the second salt about 0.05 molar and the lithium nitrate about 1 molar.

105. The cell of item 104, wherein the combined molarity of the first and second salt is about 3 molar and the lithium nitrate about 1 molar.

106. The cell of item 1, wherein the catholyte comprises:
    water; and
    an amphoteric hydroxide dissolved in water.

107. The cell of item 102 wherein the amphoteric hydroxide is selected from the group consisting of zinc hydroxide and aluminum hydroxide.

108. The cell of item 1, wherein the catholyte comprises:
    water; and
    a polyprotic organic acid dissolved in water.

109. The cell of item 108, wherein prior to initial discharge the acid is partially neutralized.

110. The cell of item 1, wherein the catholyte comprises:
    water; and
    a chemical species dissolved in water, wherein said chemical species undergoes an alkaline hydrolysis via reaction with a cell discharge product over the course of cell discharge.

111. The cell of item 1, wherein the catholyte comprises:
    water; and
    an organic acid having a vapor pressure less than that of acetic acid.

112. The cell of item 111, wherein the vapor pressure of the acid is less than 1 mmHg.

113. The cell of item 111, wherein the vapor pressure of the acid is less than $10^{-3}$ mmHg.

114. The cell of item 1, wherein the cathode further comprises a single catalyst composition, not platinum, that catalyzes both the oxygen evolution reaction and the oxygen reduction reaction.

115. The cell of item 1, wherein the cathode comprises a first catalyst composition and a second catalyst composition, the first catalyst composition catalyzing the oxygen evolution reaction during cell charge and the second catalyst composition catalyzing the oxygen reduction reaction during cell discharge.

116. A method of making or using an alkali metal/oxygen electrochemical energy storage cell, the method comprising the steps of:
    providing,
    an anode comprising an alkali metal electroactive component material,
    a cathode on or at which molecular oxygen is electroreduced during cell discharge, the cathode in alkali metal ion communication with the anode,
    a protective membrane architecture interposed between the cathode and the anode, the protective membrane architecture having a first and second major surface, the first surface adjacent to the cathode and the second surface adjacent to the anode, and
    wherein the protective membrane architecture solely allows through transport of the alkali metal ion and prevents liquids from contacting the alkali metal anode; and
    dispensing or flowing a catholyte into contact with the cathode, the catholyte comprising water and one or more evaporative-loss resistant and/or polyprotic active compounds dissolved in water that partake in a cell discharge reaction and effectuate cathode capacity for discharge in the acidic region.

117. The method of item 116, further comprising
    discharging the cell to a capacity sufficient to cause the catholyte to become basic;
    charging said battery cell to a capacity sufficient to cause the catholyte to become acidic; and
    discharging the battery cell.

118. The method of item 117, wherein the initial composition of the catholyte is sufficiently acidic to cause decomposition of solid carbonate discharge products, and further wherein said charging step involves charging the cell to a sufficient capacity to cause the catholyte pH to reach a level of acidity sufficient to dissolve and decompose carbonate.

119. The method of item 118, wherein the charging proceeds according to a protocol that includes holding the voltage constant or maintaining a constant current whence the pH of the catholyte is sufficiently acidic to decompose enough carbonate to bring the cell capacity for the subsequent discharge to more than 90% of the cell's initial rated capacity.

120. A method of making an initial catholyte for use in an alkali metal oxygen electrochemical energy storage cell, the method comprising the steps of:
providing water;
dissolving a polycarboxylic acid in water; and
dissolving a chemical species in water that undergoes an electron donor-acceptor reaction with the polycarboxylic acid.

Alternative Embodiments

While the invention is described primarily in terms of Li and Li alloys anodes, other alkali metal anodes, in particular sodium (Na) may also be used in alternative embodiments. In such an alternative embodiment, the protective membrane architecture on the anode is configured for high ionic conductivity of the alkali metal ions of the anode material. For example, a protective membrane architecture for a Na metal anode may include a solid electrolyte layer composed of Nasicon.

CONCLUSION

Although the foregoing invention has been described in some detail for purposes of clarity of understanding, it will be apparent that certain changes and modifications may be practiced within the scope of the invention, in particular the appended claims. It should be noted that there are many alternative ways of implementing both the devices and methods of the present invention. Accordingly, the present embodiments are to be considered as illustrative and not restrictive, and the invention is not to be limited to the details given herein.

What is claimed:

1. An alkali metal/oxygen battery cell, the cell comprising:
an anode comprising an alkali metal electroactive component material;
an open-to-ambient-air cathode on or at which molecular oxygen obtained from the ambient air is electro-reduced during cell discharge, the cathode in alkali metal ion communication with the anode;
an aqueous catholyte comprising water and one or more evaporative-loss resistant and polyprotic active compounds dissolved in water that partake in a cell discharge reaction and effectuate cathode capacity for discharge below pH 7, the catholyte in contact with said cathode, wherein the one or more evaporative-loss resistant and polyprotic active compounds comprises a polyprotic acid that dissociates over the course of discharge, thus yielding two or more active protons per acid molecule in the catholyte that partake in the cell reaction as the discharge proceeds; and
a protective membrane architecture interposed between the cathode and the anode, the protective membrane architecture having a first and second major surface, the first surface adjacent to the cathode and in contact with the catholyte and the second surface adjacent to the anode;
wherein the protective membrane architecture solely allows through transport of the alkali metal ion and prevents liquids from contacting the alkali metal anode; and
wherein the polyprotic acid comprises a species that dissociates over the course of discharge yielding two or more active protons per acid molecule in the catholyte that partake in the cell reaction as the discharge proceeds selected from the group consisting of:

a carboxylic acid, the acid represented by the following general formula

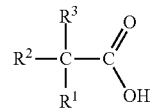

wherein $R^1$ represents an organic radical,
wherein $R^2$ represents H or an organic radical,
wherein $R^3$ represents H or an organic radical, and
wherein at least one of the organic radicals represented by $R^1$, $R^2$ or $R^3$ comprises a carboxyl group;
an amino acid, the amino acid represented by the following general formula

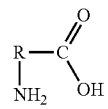

wherein R represents an aliphatic or aromatic optionally substituted organic divalent radical;
a hydroxy acid, the hydroxy acid represented by the following general formula

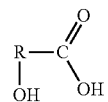

wherein R represents an aliphatic or aromatic optionally substituted organic divalent radical;
a metal acid salt of a polycarboxylic acid comprising a carboxylate anion, two or more acidic protons, and one or more metal cations or a neutral or acid onium salt of polycarboxylic acid comprising a carboxylate anion, one or more onium cations, and two or more acidic protons if the onium salt is an acid onium salt;
an inorganic acid salt selected from the group consisting of lithium dihydrogen phosphate and lithium hydrogen selenite, and combinations thereof;
a carboxylic acid derivative, wherein the hydroxyl moiety of the carboxyl group is replaced by an atom or a group of atoms comprising an electronegative atom, and the chemical group is not a hydroxyl group;
an ester of an inorganic acid represented by the general formula $X(OR)_n$
wherein R is an aliphatic or aromatic optionally substituted organic radical,
$X=N(=O)_2$, $S(=O)_2$, or $P=O$, and
n is basicity of an acid from which the ester was derived;
a phenol represented by the general formula

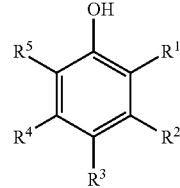

wherein R¹-R⁵ are an aliphatic or aromatic optionally substituted organic radical;
an aminium salt;
an amphoteric hydroxide;
a polyprotic organic acid; and
an organic acid having a vapor pressure less than that of acetic acid.

2. The cell of claim 1, wherein the catholyte comprises:
water; and
a carboxylic acid dissolved in water, the acid represented by the following general formula

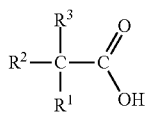

wherein $R^1$ represents an organic radical;
wherein $R^2$ represents H or an organic radical; and
wherein $R^3$ represents H or an organic radical;
wherein at least one of the organic radicals represented by $R^1$, $R^2$ or $R^3$ comprises a carboxyl group.

3. The cell of claim 2, wherein the carboxylic acid is malonic acid, thus $R^2$ and $R^3$ represent H and $R^1$ represents a carboxyl group.

4. The cell of claim 2, wherein at least one of $R^1$, $R^2$ and $R^3$ represents an organic radical selected from the group consisting of an optionally substituted $C_1$-$C_{10}$ alkyl group, optionally substituted $C_2$-$C_{10}$ alkenyl group, optionally substituted $C_2$-$C_{10}$ alkynyl group.

5. The cell of claim 2, wherein at least one of $R^1$, $R^2$ and $R^3$ represents an organic radical selected from the group consisting of an optionally substituted $C_4$-$C_{10}$ cycloalkyl, optionally substituted $C_4$-$C_{10}$ cycloalkenyl, and optionally substituted 3-10 membered heterocycle.

6. The cell of claim 2, wherein at least one of $R^1$, $R^2$ and $R^3$ represent an organic radical selected from the group consisting of an optionally substituted carbo- and heterocyclic 5-10 membered aryl.

7. The cell of claim 2, wherein the carboxylic acid is selected from the group consisting of malonic acid, glutaric acid, and methylsuccinic acid.

8. The cell of claim 2, wherein the equivalent weight of the acid that partakes in the cell discharge reaction, is selected from the range of values consisting of 50-70 g/equivalent of $H^+$; 71-90 g/equivalent of $H^+$; 91-110 g/equivalent of $H^+$.

9. The cell of claim 2, wherein the concentration of the carboxylic acid in the catholyte is between 0.05 molar and 1 molar.

10. The cell of claim 2, wherein the catholyte is saturated with carboxylic acid and further comprises solid phase carboxylic acid in contact with its solution.

11. The cell of claim 2, wherein the catholyte is saturated with the carboxylic acid.

12. The cell of claim 3, wherein the concentration of malonic acid in the catholyte is selected from the molar range consisting of 0.5 molar to 2 molar, 2 molar to 4 molar, and greater than 4 molar.

13. The cell of claim 2, further comprising a lithium salt dissolved in water.

14. The cell of claim 1 wherein the pH of the catholyte prior to initial discharge is less than 7.

15. The cell of claim 1, wherein the catholyte comprises:
water; and
an amino acid dissolved in water, the amino acid represented by the following general formula

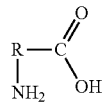

wherein R represents an aliphatic or aromatic optionally substituted organic divalent radical.

16. The cell of claim 1, wherein the catholyte comprises:
water; and
a hydroxy acid dissolved in water, the hydroxy acid represented by the following general formula

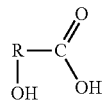

wherein R represents an aliphatic or aromatic optionally substituted organic divalent radical.

17. The cell of claim 1, wherein the catholyte comprises:
a metal acid salt of a polycarboxylic acid comprising a carboxylate anion, one or more acidic protons, and one or more metal cations or a neutral or acid onium salt of polycarboxylic acid comprising a carboxylate anion, one or more onium cations, and one or more acidic protons if the onium salt is an acid onium salt;
wherein the metal acid salt or the onium neutral or acid salt is present in the catholyte prior to actively operating the battery cell.

18. The cell of claim 1, wherein the catholyte comprises:
water; and
an inorganic acid salt selected from the group consisting of lithium dihydrogen phosphate and lithium hydrogen selenite, and combinations thereof.

19. The cell of claim 1, wherein the catholyte comprises:
water;
an aprotic solvent; and
a carboxylic acid derivative, wherein the hydroxyl moiety of the carboxyl group is replaced by an atom or a group of atoms comprising an electronegative atom, and the chemical group is not a hydroxyl group.

20. The cell of claim 1, wherein the catholyte comprises:
water;
an aprotic solvent; and
an ester of an inorganic acid represented by the general formula $X(OR)_n$
wherein R is an aliphatic or aromatic optionally substituted organic radical;
$X=N(=O)_2$, $S(=O)_2$, or $P=O$; and
n is basicity of an acid from which the ester was derived.

21. The cell of claim 1, wherein the catholyte comprises:
water; and an organic acid comprising an element selected from the group consisting of sulfur, nitrogen and phosphorus.

22. The cell of claim 1, wherein the catholyte comprises:
water; and
a phenol represented by the general formula

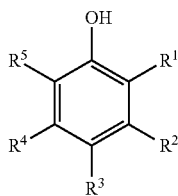

wherein $R^1$-$R^5$ are an aliphatic or aromatic optionally substituted organic radical.

23. The cell of claim 1, wherein the catholyte comprises:
water; and
an aminium salt dissolved in water.

24. The cell of claim 1, wherein the catholyte comprises:
water; and
an amphoteric hydroxide dissolved in water.

25. The cell of claim 1, wherein the catholyte comprises:
water; and
a polyprotic organic acid dissolved in water.

26. The cell of claim 1, wherein the catholyte comprises:
water; and
an organic acid having a vapor pressure less than that of acetic acid.

27. The cell of claim 26, wherein the vapor pressure of the acid is less than 1 mmHg.

28. The cell of claim 26, wherein the vapor pressure of the acid is less than $10^{-3}$ mmHg.

29. The cell of claim 1, wherein the cathode further comprises a single catalyst composition, not platinum, that catalyzes both the oxygen evolution reaction and the oxygen reduction reaction.

30. The cell of claim 1, wherein the cathode comprises a first catalyst composition and a second catalyst composition, the first catalyst composition catalyzing the oxygen evolution reaction during cell charge and the second catalyst composition catalyzing the oxygen reduction reaction during cell discharge.

31. A method of making or using an alkali metal/oxygen electrochemical energy storage cell, the method comprising the steps of:
providing,
an anode comprising an alkali metal electroactive component material,
an open-to-ambient-air cathode on or at which molecular oxygen obtained from the ambient air is electro-reduced during cell discharge, the cathode in alkali metal ion communication with the anode,
a protective membrane architecture interposed between the cathode and the anode, the protective membrane architecture having a first and second major surface, the first surface adjacent to the cathode and the second surface adjacent to the anode, and
wherein the protective membrane architecture solely allows through transport of the alkali metal ion and prevents liquids from contacting the alkali metal anode; and
dispensing or flowing a catholyte into contact with the cathode, the catholyte comprising water and one or more evaporative-loss resistant and polyprotic active compounds dissolved in water that partake in a cell discharge reaction and effectuate cathode capacity for discharge below pH 7, wherein the one or more evaporative-loss resistant and polyprotic active compounds comprises a polyprotic acid that dissociates over the course of discharge, thus yielding two or more active protons per acid molecule in the catholyte that partake in the cell reaction as the discharge proceeds; and
wherein the polyprotic acid comprises a species that dissociates over the course of discharge yielding two or more active protons per acid molecule in the catholyte that partake in the cell reaction as the discharge proceeds selected from the group consisting of:
a carboxylic acid, the acid represented by the following general formula

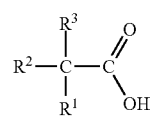

wherein $R^1$ represents an organic radical,
wherein $R^2$ represents H or an organic radical,
wherein $R^3$ represents H or an organic radical, and
wherein at least one of the organic radicals represented by $R^1$, $R^2$ or $R^3$ comprises a carboxyl group;
an amino acid, the amino acid represented by the following general formula

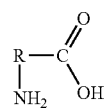

wherein R represents an aliphatic or aromatic optionally substituted organic divalent radical;
a hydroxy acid, the hydroxy acid represented by the following general formula

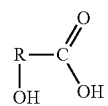

wherein R represents an aliphatic or aromatic optionally substituted organic divalent radical;
a metal acid salt of a polycarboxylic acid comprising a carboxylate anion, two or more acidic protons, and one or more metal cations or a neutral or acid onium salt of polycarboxylic acid comprising a carboxylate anion, one or more onium cations, and two or more acidic protons if the onium salt is an acid onium salt;
an inorganic acid salt selected from the group consisting of lithium dihydrogen phosphate and lithium hydrogen selenite, and combinations thereof;
a carboxylic acid derivative, wherein the hydroxyl moiety of the carboxyl group is replaced by an atom or a group of atoms comprising an electronegative atom, and the chemical group is not a hydroxyl group;
an ester of an inorganic acid represented by the general formula $X(OR)_n$
wherein R is an aliphatic or aromatic optionally substituted organic radical,
$X=N(=O)_2$, $S(=O)_2$, or $P=O$, and
n is basicity of an acid from which the ester was derived;

a phenol represented by the general formula
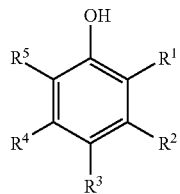
wherein $R^1$-$R^5$ are an aliphatic or aromatic optionally substituted organic radical;
an aminium salt;
an amphoteric hydroxide;
a polyprotic organic acid; and
an organic acid having a vapor pressure less than that of acetic acid.
* * * * *